United States Patent [19]

Hamaguchi

[11] Patent Number: 5,757,798
[45] Date of Patent: May 26, 1998

[54] IMAGE INFORMATION DISTRIBUTION SYSTEM

[75] Inventor: Naohisa Hamaguchi, Yokohama, Japan

[73] Assignee: Hitachi, Ltd., Tokyo, Japan

[21] Appl. No.: 505,629

[22] Filed: Jul. 21, 1995

[30] Foreign Application Priority Data

| Jul. 21, 1994 | [JP] | Japan | 6-169211 |
| Jul. 21, 1994 | [JP] | Japan | 6-169213 |

[51] Int. Cl.⁶ .......................... H04L 12/56; H04N 7/173
[52] U.S. Cl. ...................... 370/397; 370/409; 370/410; 348/7; 348/13; 455/4.2
[58] Field of Search .................. 370/259, 270, 370/389, 390, 395, 396, 397, 400, 409, 410, 522, 905; 348/6, 7, 10, 12, 13, 14, 423, 461, 467, 469, 487; 455/4.1, 4.2, 5.1, 6.1; H04N 7/14, 7/16, 7/173

[56] References Cited

U.S. PATENT DOCUMENTS

| 5,434,852 | 7/1995 | La Porta et al. | 370/58.2 |
| 5,440,334 | 8/1995 | Walters et al. | 348/6 |
| 5,477,263 | 12/1995 | O'Callaghan et al. | 348/7 |
| 5,481,542 | 1/1996 | Logston et al. | 370/94.2 |
| 5,506,615 | 4/1996 | Awaji | 348/7 |
| 5,513,180 | 4/1996 | Miyake et al. | 370/60.1 |

FOREIGN PATENT DOCUMENTS

| 62-188579 | 8/1987 | Japan . |
| 1-238392 | 9/1989 | Japan . |
| 2-186791 | 7/1990 | Japan . |
| 4-156040 | 5/1992 | Japan . |
| 4-215357 | 8/1992 | Japan . |
| 5-35407 | 2/1993 | Japan . |
| 5-122675 | 5/1993 | Japan . |
| 5-122695 | 5/1993 | Japan . |

*Primary Examiner*—Alpus H. Hsu
*Attorney, Agent, or Firm*—Antonelli, Terry, Stout, & Kraus, LLP

[57] ABSTRACT

An image information distribution system is provided for distributing image information via a communication network to subscribers. When a subscriber changes an image information specification channel, the system changes the channel at high speed, shortening the image information wait time. An image information distribution system is also provided for offering a video on demand service. Thus, in the image information distribution system, in addition to image information requested by a subscriber, other image information is also provided for a subscriber accommodation node according to a predetermined image information selection rule. The node includes means for extracting the image information requested by the subscriber from a plurality of provided image information entries, and providing it to the subscriber. When the subscriber requests change of the image information, setting of the image information extraction means is changed and new image information is extracted from the provided image information entries and provided to the subscriber. The node contains a memory for temporarily storing image information corresponding to each subscriber and a controller for controlling read of the memory. Image information is stored in the memory in response to a subscriber's request, and the controller then provides the stored information to the subscriber by controlling read of the memory according to the subscriber's request, such as reproduction, stop, making still, skip, or retrieval.

10 Claims, 12 Drawing Sheets it takes between several to 30 seconds from the time a subscriber requests setting a communication channel to the time the communication channel is set up. Thus, for the subscriber to obtain image information from a number of channels or image providing nodes, the channel change time increases, increasing the subscriber wait time. Thus an easy-to-use system is not provided.

IMAGE INFORMATION DISTRIBUTION SYSTEM

The present application is a related application to U.S. Ser. No. 08/505,630.

BACKGROUND OF THE INVENTION

1. Field of the Invention

This invention relates to the configuration of an image information distribution system which distributes image information to one or more subscribers and more particularly to an image information distribution system which provides image information in a communication network using an asynchronous transfer mode (ATM) communication system.

2. Description of the Related Art

The ATM communication system enables information requiring a broad-band transmission line, such as an image, to be transmitted through a public switch network. In such a system, broadcasting of image information such as a video dial tone is common place, as well as he usual one-to-one communication. Challenges for the system which provides video a dial tone on the public switch network are to efficiently broadcast broad-band image information and to implement a system which provides pay per view (PPV) for a subscriber to pay a toll on a pay-per-view basis and video on demand (VOD) providing a subscriber with a desired program at a desired time, and a cable television (CATV) system offering PPV and VOD services.

To provide image information in the CATV service, etc., through the public switch network in the related art, a synchronous transfer mode (STM) communication system is used to provide image information, as disclosed in Japanese Patent Laid-Open No.Hei 1-238392. That is, image information of a number of channels is assigned to time slots from the center providing the image information and is transmitted to downstream remote nodes from which the image information is assigned and transmitted to time slots assigned to subscribers. This system configuration requires that a given bandwidth is always assigned as a CATV transmission channel. Thus, to provide image information for each subscriber as in the video on demand (VOD), time slots are in short supply between the center and remote nodes. The ATM system may be adopted to avoid shortage of the time slots and eliminate the need for always providing the CATV transmission bandwidth, which degrades the usage efficiency of transmission lines. However, to distribute information by the ATM system, an ATM distribution switch must be provided, leading to large-scaled hardware and complicated control, wherein, for example, as disclosed in Japanese Patent Laid-Open No.Hei 2-186791, a control system is adopted which uses a distribution switch to distribute information to each outgoing line.

In the conventional public communication network, it takes between several to 30 seconds from the time a subscriber requests setting a communication channel to the time the communication channel is set up. Thus, for the subscriber to obtain image information from a number of channels or image providing nodes, the channel change time increases, increasing the subscriber wait time. Thus an easy-to-use system is not provided.

Further, when the video on demand (VOD) service is offered via the public communication network, the subscriber may want a system which enables him or her to not only receive image information passively, but also to perform screen control of "stop," "fast forward," "rewind," "play," etc., as if the subscriber were operating his or her home video cassette recorder. In such a system, image information is stored in a node remote from subscriber's homes, and thus a delay develops at the node with respect to reception of a control signal from the subscriber's home. Further, since similar control signals are received from a large number of subscribers and serial processing is performed, a delay develops between the reception of a control signal and the actual processing of the control signal. For example, if one subscriber receiving the VOD service presses the STOP button on customer premises equipment to stop the image on one scene so as to obtain a still picture, the image does not actually stop until the controller at the node storing the image processes the control signal. Particularly, if the scene changes in the meantime, an entirely different still picture will be provided.

SUMMARY OF THE INVENTION

It is therefore an object of the invention to provide an image information distribution system having a simple configuration and control method therefore, and more particularly to an easy-to-use image information distribution system for distributing CATV image information to subscribers via a public communication network, efficiently and at high speed, using transmission lines whenever the subscribers require the image information. Namely, an economical image information distribution system of simple configuration using an ATM communication system, so that when the subscriber changes a channel, the channel is rapidly changed and new image information is provided.

It is another object of the invention to provide an economical and easy-to-use image information distribution system having simple configuration using an ATM communication system which, in turn has an excellent user interface for enabling screen control such as "stop," "fast forward," "rewind," and "play start" of an image at the instant at which a subscriber desires in a system, such as a VOD service system, which can provide necessary information for subscribers at high speed whenever they require it and enables the subscribers to control sending of the image information.

According to the invention, there is provided an image information distribution system comprising an image information providing node, an image information distribution node, subscriber accommodation nodes, and customer premises equipment, wherein the ATM communication system is used to transfer image information among the nodes and customer premises equipment.

The image information providing node sends out image information of video, voice, etc., compressed by a system such as MPEG2, received from other nodes or stored in the node.

The image information distribution node distributes image information received from the image information providing node to other nodes by means of the image information distribution node or an optical splitter, etc., installed in an optical fiber network between the image information distribution node and the subscriber accommodation node for passively distributing a light signal.

The subscriber accommodation nodes receive image information from the image information distribution node and distribute it to subscribers.

The customer premises equipment converts image information received from the subscriber accommodation node into the normal television signal format and sends the television signal to a monitor.

In the configuration, when a number of subscribers request the same image information, one ATM connection is set from the image information providing node to the image information distribution node and the image information is distributed from the image information distribution node to all subscriber accommodation nodes. Image information requiring a wide band between the image information providing node and the image information distribution node can be transmitted through one ATM connection, which is an economical configuration. Moreover, since image information is classified into types and a virtual path (VP) is set for each type (ATM connection is set), line quality is ensured in the virtual path VP units, thereby providing substantially constant image information quality in service units, eliminating image information variations from one subscriber to another. That is, to distribute the same image information from the image information providing node to subscribers, the virtual paths (VPs) are set in the image information providing service units and the image information is transmitted through one ATM connection from the image information providing node to the image information distribution node, enabling efficient use of line resources. The image information is distributed from the image information distribution node without using a multicast switch and moreover the virtual paths are set in the service units, facilitating management in the image information providing service units and offering service of equal quality to all subscribers as compared with the case where VPs are set in subscriber units.

In such a configuration, since all image information sent out by the image information distribution node is received at all subscriber accommodation nodes, cell filters are installed in the subscriber accommodation nodes for extracting only ATM cells containing the necessary information requested by the subscribers from the lines before sending it to the subscribers.

Specifically, when one subscriber requests the corresponding subscriber accommodation node to send necessary information through his or her customer premises equipment, the virtual path identifier (VPI) and the virtual channel identifier (VCI) of the ATM cell carrying the image information are set in the cell filter corresponding to the subscriber installed in the subscriber accommodation node, to allow only the ATM cell having the VPI and VCI to pass while discarding ATM cells not having the VPI or VCI, thereby receiving only the necessary image information.

Thus, the image information distribution node can distribute image information using a simple configuration and can exercise control without controlling specific outgoing lines.

As means for providing new image information at high speed for a subscriber in the system as described above, so that desired image information can be obtained immediately if the subscriber requests the image information (program or menu) currently being received to be changed to different image information (program or menu), for example, when image information is successively retrieved by operating the customer premises equipment, the system of the invention is provided with a function for previously requesting other image information (programs or menus) to be sent according to a predetermined image information (program or menu) selection rule in such a manner that when one subscriber selects image information (program or menu) on channel α, the subscriber accommodation node or the image information providing node is requested to send image information (programs or menus) on channels α+1 and α−1 preceding and following the selected channel α, in addition to the image information (program or menu) on the channel α.

That is, the subscriber accommodation node receives image information (programs or menus) on channels α, α+1, and α−1 from the image information providing node, and extracts only the image information (program or menu) on the channel requested by the subscriber through the cell filter corresponding to the subscriber, which is installed in the subscriber accommodation node, for sending it to the subscriber. The customer premises equipment is provided with an operation device, such as a control pad, for handling image information. The operation device is provided with channel change means like "up" and "down" in addition to a ten-key pad for directly inputting channel numbers for providing image information (programs or menus). If the subscriber operates "up" while watching an image (program or menu) on the channel α, the subscriber accommodation node changes the VPI and VCI set in the cell filter to the VPI and VCI having image information (program or menu) on the channel α+1, so as to select the image information (program or menu) on the channel α+1 already received at the subscriber accommodation node, and provides it to the subscriber. In contrast, if the subscriber operates "down," the image information (program or menu) on the channel α−1 is provided to the subscriber in a similar manner. Further, if the subscriber changes the received image information (program or menu), for example, to the image information (program or menu) on the channel α+1 as described above, the subscriber accommodation node requests the image information providing node to send the image information (program or menu) on the channel α+2 according to the predetermined image information (program or menu) selection rule, and when other subscribers do not use the image information (program or menu) on the channel α−1, it releases the ATM connection transmitting the image information (program or menu) on the channel α−1. That is, the subscriber accommodation node requests the image information providing node to send image information (programs or menus) on other channels according to the predetermined image information (program or menu) selection rule at the same time, in addition to the image information (programs or menus) on the channel requested by the subscriber accommodated in the subscriber accommodation node. If the subscriber operates the operation device to request another program or menu when they have selected one program or menu, the subscriber accommodation node can send out the image information (program or menu) received according to the predetermined image information (program or menu) selection rule by simply changing the setting of the cell filter. Channels can be changed at high speed for providing new image information (program or menu) for the subscriber by simple negotiation between the subscriber accommodation node and the customer premises equipment, without setting a new connection or releasing the existing connection. The predetermined image information (program or menu) selection rule may be selection of image information (programs or menus) on channels preceding and following the channel providing the image information (program or menu) selected by the subscriber, selection of image information (programs or menus) having a high audience rating by the image information providing service provider, in addition to the image information (program or menu) selected by the subscriber, or selection of image information (programs or menus) similar to the image information (program or menu) selected by the subscriber. In any event, information for a number of image (programs or menus) entries are previously received at the subscriber accommodation node for providing image information (program or menu) at high speed.

If the subscriber selects a channel at random, new image information (program or menu) selected by the subscriber may not be prereceived at the subscriber accommodation node. In this case, the subscriber accommodation node newly requests the image information providing node to send the image information (program or menu). Since the image information distribution system of the invention classifies image information into types, and sets a VP for each type (sets the ATM connection), when a new image information (program or menu) request occurs, the VP in the service unit is already set. Virtual channels (VCs) for control are semi-fixed in the VP for performing channel change at high speed.

The system is also provided with a function of programming the image information to be provided and the image information providing time and a timer and a function of controlling power to the monitor for displaying image information at the customer premises equipment, whereby the image information requested by the subscriber is provided at the time requested by the subscriber.

When the same image information is distributed from the image information providing node to subscribers, if ATM connection is maintained until the subscriber accommodation node for each subscriber, and the image information is sent to the subscribers separately, as many image information transmission bands as the number of subscribers will be required. According to the configuration of the invention, virtual paths are set in the image information providing service units and image information is transmitted through one ATM connection from the image information providing node to the image information distribution node, enabling efficient use of line resources between the nodes.

The image information can be distributed without using the multicast switch from the image information distribution node.

Since the system is provided with the function whereby when one subscriber requests image information (program or menu), the subscriber accommodation node also previously receives other image information (programs or menus) according to the predetermined image information (program or menu) selection rule, if the subscriber requests the current image information (program or menu) being received to be changed to different image information (program or menu), fast channel change is enabled for immediately providing the desired image information without setting a new connection or releasing the existing connection by simply changing the setting of the cell filter in the subscriber accommodation node.

Further, each time the subscriber operates the customer premises equipment, etc., for requesting the current image information (program or menu) to be changed to different image information (program or menu), the subscriber accommodation node also previously receives other image information (programs or menus) according to the predetermined image information (program or menu) selection rule. Therefore, if the subscriber successively retrieves image information, new image information can be provided to the subscriber at high speed.

Virtual channel (VCs) dedicated to control signals are semi-fixed in the VP set in the service unit, whereby the VC setting sequence can be omitted for sending out control information from the subscriber accommodation node to the image information providing node. That is, if the subscriber accommodation node has already received image information necessary for one subscriber, the image information can be sent out to the subscriber according to an image information sending procedure by negotiation between the subscriber accommodation node and the customer premises equipment of the subscriber in a short sequence, to enable a short response time without negotiation with the image information providing node.

The image information distribution system of the invention comprises an image information memory installed at any of the nodes in the network for temporarily storing image information corresponding to ATM connection for image information providing a service such as VOD, and a controller installed in the node for receiving a control signal from the subscribers.

When one subscriber makes a service request such as for VOD, an ATM virtual channel VC is set between the subscriber and the node where the image information memory is installed. When the image information memory installation node differs from the image information providing node, an ATM VC is also set between the nodes.

After the VCs are set, image information is transferred from the image information providing node to the image information memory and temporarily stored in the memory.

After the transfer ends, the connection between image information storage and the image information memory is disconnected for releasing the image information storage.

When the image information is transferred to the image information memory, a service ready message is displayed for the subscriber requesting the image information providing service such as VOD.

Then, if a "play" requesting control signal is received from the subscriber, the temporarily stored image information is reproduced from the image information memory.

When a control signal requesting "stop," "fast forward," or "rewind" of image information is received from the subscriber, the image information memory is controlled in correspondence with the request control signal, to provide the image information as requested by the subscriber.

In such a configuration, when image information is being reproduced, if the subscriber sends a control signal requesting "stop" of the image information, for stopping the moving image and requesting a still picture, the still picture of the scene at the instant at which the subscriber operates the "stop" signal must be sent out. If the controller at the image information memory installation node sends out the scene sent out from the image information memory as the still picture simply at the point in time at which it receives the control signal, the still picture of a scene delayed from the still picture requested by the subscriber will be sent out. The subscriber cannot obtain the requested still screen. Therefore, the image information distribution system of the invention comprises the following two means for carrying out correction and sending out the scene desired by the subscriber.

As one means, the image information memory address or time information from the top position of the image information is contained in each image frame, for providing a mark indicating the time sequence for each image frame, whereby the mark is contained in a control signal requesting "stop," "fast forward," "rewind," or "play (reproduction)" of image information sent out by the subscriber which makes it possible to reliably specify and display the image frame desired by the subscriber.

Another means is applicable even to image information not containing such a mark. An average value T of time t taken from the subscriber sending out a control signal, to the controller in the image information memory installation node processing it, is previously calculated. When the image information memory installation node receives a control signal of "stop," etc., from the subscriber as described above, the still picture of the image information frame at the time T before is sent out, thereby sending out a still picture as close as possible to the image desired by the subscriber.

Thus, even if the image information storage has only a function of sending image information sequentially, image information is copied into the image information memory, whereby the subscriber can control the image information in image frame units by taking advantage of random accessibility to the memory.

That is, when the subscriber requests a service such as VOD, the requested image information is temporarily copied into the image information memory from which it is sent out to the subscriber. Thus, the subscriber can perform control such as "stop," "rewind," or "play (reproduction)" for the image information as they operate their home video cassette recorder, as well as obtaining desired image information at the desired time.

Further, since output of image information stored in the image information memory can be controlled using the marks contained in the image information or predetermined time information in response to a subscriber's request, a desired screen can be sent out to the subscriber even if it takes time in transferring a control signal between the subscriber and the image information memory installation node.

"Fast forward," "rewind," etc., can be performed at high speed by using a random access memory for the image information memory. Image positions can also be retrieved in memory address units. If the image information does not contain time specification information such as a memory address, screen control for a frame close to the frame of the image desired by the subscriber is enabled by previously calculating the time taken from the subscriber sending out a control signal, to the controller in the image information memory installation node processing it.

DESCRIPTION OF THE PREFERRED EMBODIMENTS

Referring now to the accompanying drawings, there are shown preferred embodiments of the invention.

Figure 1:
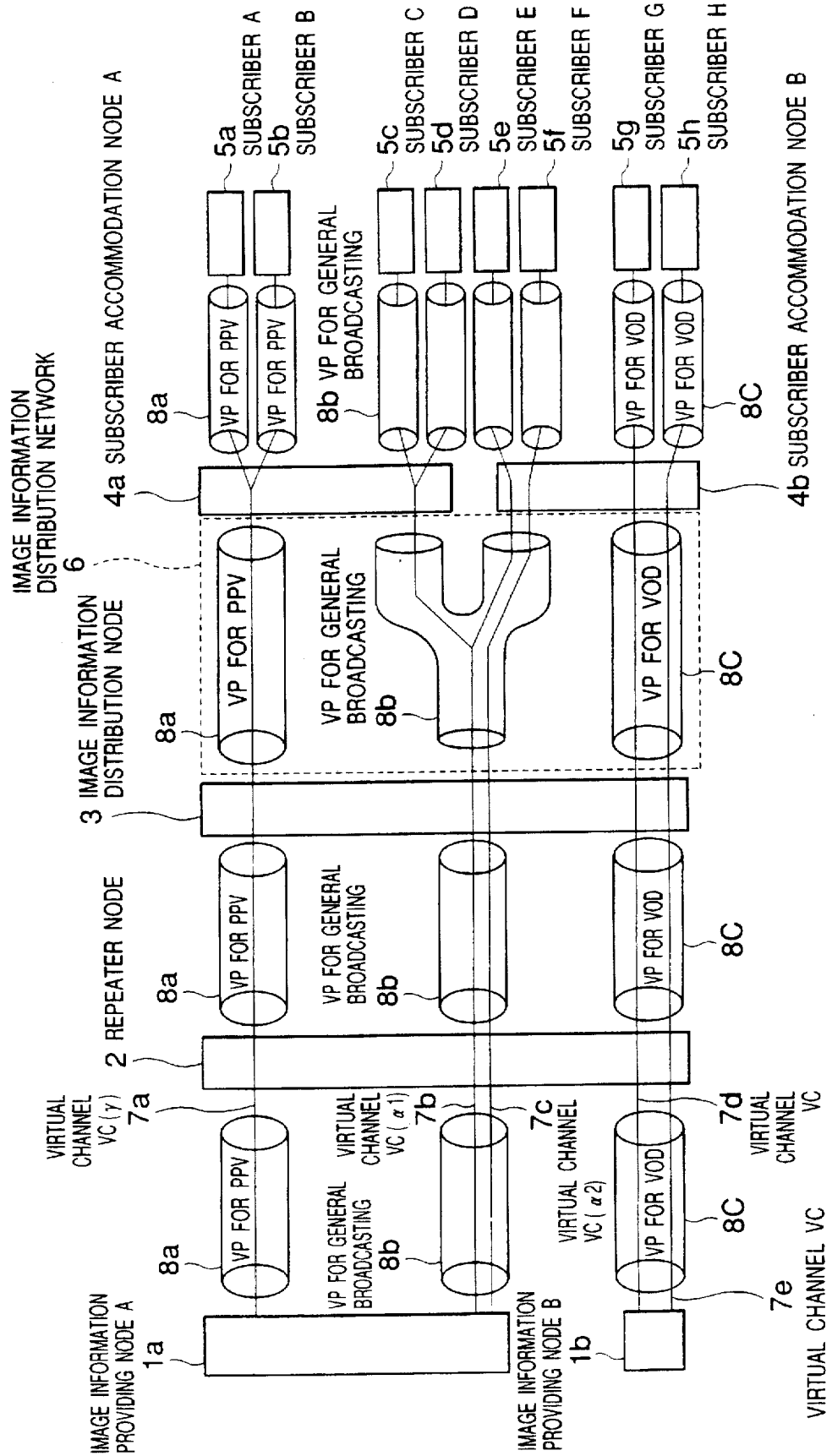
FIG. 1 is a network block diagram showing the overall configuration of an image information distribution system of the invention.

FIG. 1 is an overall block diagram showing the configuration and connection of an image information distribution system of the invention. The image information distribution system comprises image information providing nodes 1a and 1b for storing image information and providing image information in response to subscriber's requests (in the embodiment, two nodes A 1a and B 1b dealing with an image providing service described below), subscribers 5a to 5h receiving the image providing service (in the embodiment, subscribers A 5a to H 5h), subscriber accommodation nodes 4a and 4b for accommodating the subscribers 5a to 5h and sending image information requested by the subscribers 5a to 5h (in the embodiment, two nodes A 4a and B 4b meeting the number of subscribers), and an image information distribution node 3 for distributing image information from the image information providing nodes 1a and 1b to the subscriber accommodation nodes 4a and 4b. The system connects the three types of nodes and the subscribers by asynchronous transfer mode transmission lines (ATM lines) and distributes image information in response to subscriber's requests from the image information providing nodes 1a and 1b to the subscribers 5a to 5h through ATM cells. In FIG. 1, an image information distribution network 6 is an ATM line network for distributing image information from the image information distribution node 3 to all subscriber accommodation nodes 4a and 4b. A repeater node 2 is provided to repeat information according to the image information distribution distance, etc. In the embodiment, repeater node 2 is located between the image information providing nodes 1a and 1b and the image information distribution node 3, but it may be located between other nodes or omitted altogether, depending on the scale of the image information distribution system.

Figure 2:
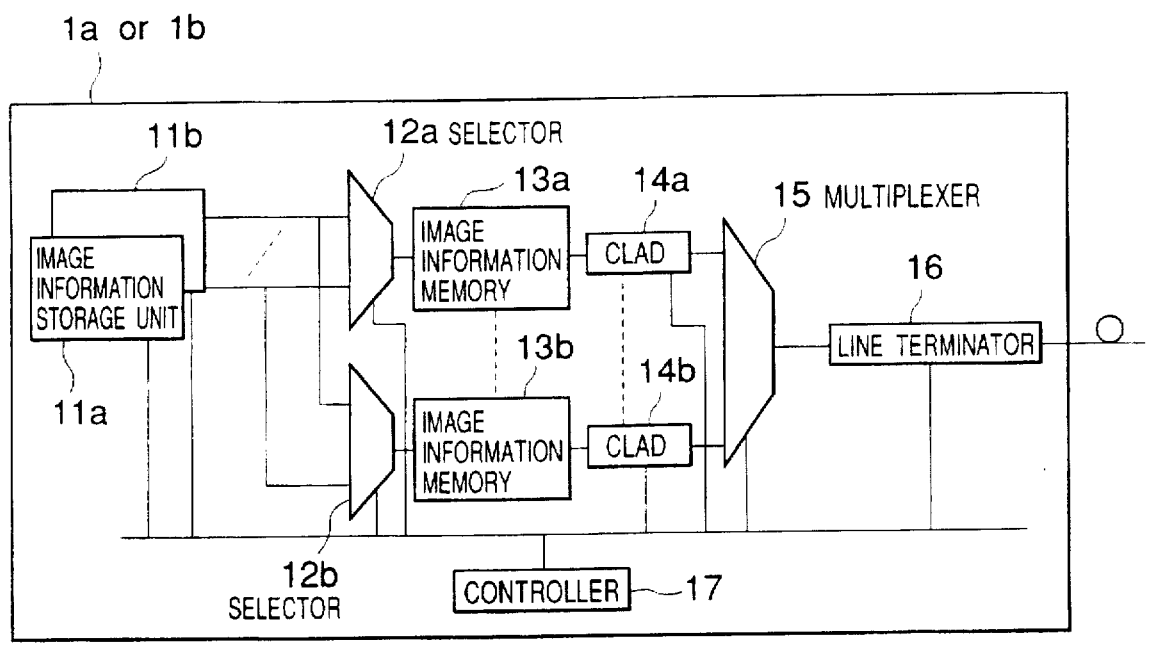
FIG. 2 is a block diagram showing the configuration of image information providing nodes used with the image information distribution system of the invention.

FIG. 2 is a block diagram showing a configuration example of the image information providing nodes 1a and 1b, each of which comprises image information storage units 11a and 11b for previously storing a large number of items of image information to be provided for the subscribers, selectors 12a and 12b for selecting image information in response to subscriber's requests from the storage units 11a and 11b, image information memories 13a and 13b for temporarily holding selected image information in correspondence with the service to be offered, CLADs 14a and 14b for converting image information into the ATM cell format, a multiplexer 15 for multiplexing a plurality of ATM cells, a line terminator 16, an interface with ATM lines, and a controller 17 for controlling the entire image information providing node 1a or 1b. In the embodiment, image information is stored in the image information storage units 11a and 11b in a compressed form such as MPEG2 (Moving Picture Experts Group 2) so that a large number of items of image information can be stored. The memories 13a and 13b may be installed in other nodes rather than the image information providing node 1a or 1b, as described below.

Figure 3:
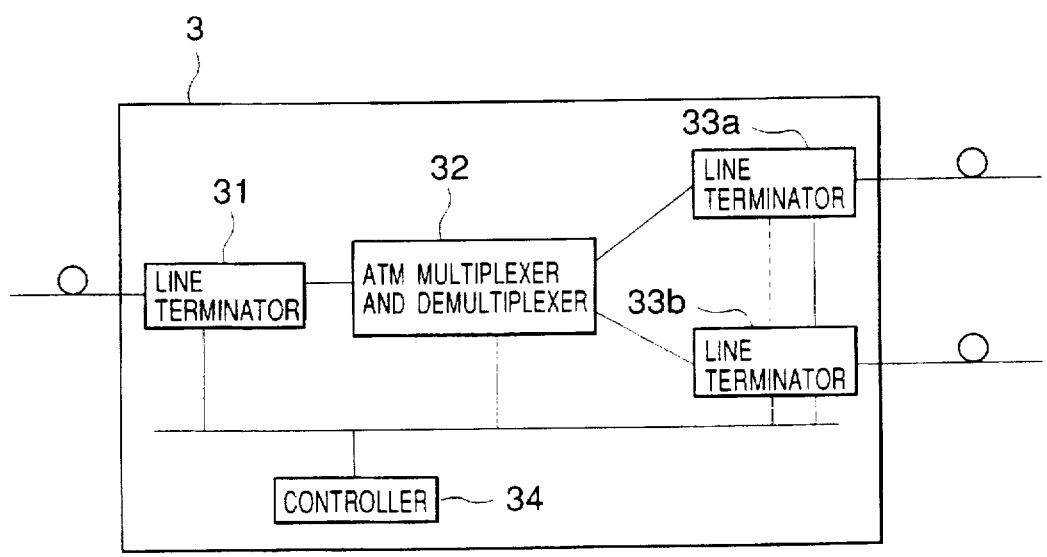
FIG. 3 is a block diagram showing one configuration of an image information distribution node used with the image information distribution system of the invention.
Figure 4:
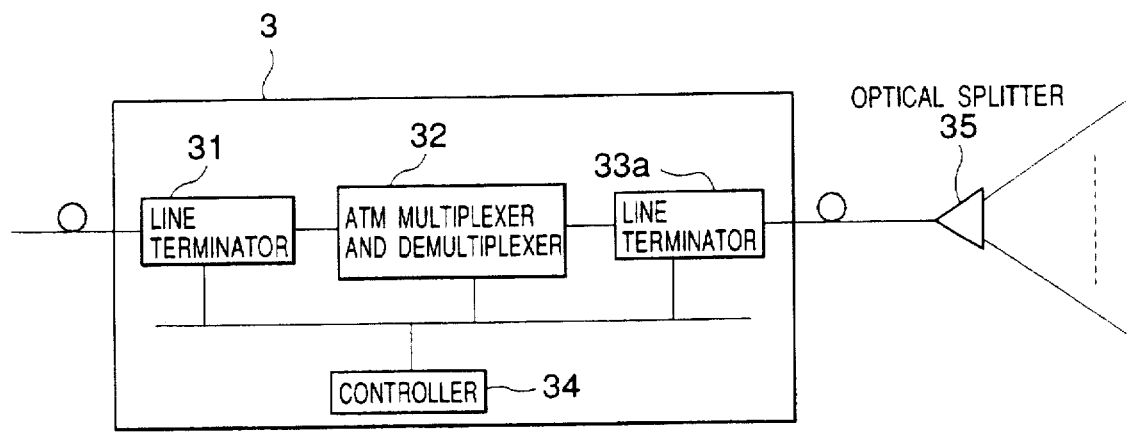
FIG. 4 is a block diagram showing another configuration of an image information distribution node used with the image information distribution system of the invention.

FIGS. 3 and 4 are block diagrams showing configuration examples of the image information distribution node 3, each of which comprises an ATM multiplexer and demultiplexer 32 for distributing ATM cells, line terminators 31 and 33a interfacing with ATM lines, and a controller 34 for controlling the entire image information distribution node 3.

For the image information distribution node 3 in FIG. 3 to distribute ATM cells to all subscriber accommodation nodes 4a and 4b, the ATM multiplexer and demultiplexer 32 distributes the ATM cells. Line terminators corresponding to the subscriber accommodation nodes are required, and a line terminator 33b is added.

For the image information distribution node 3 in FIG. 4 to distribute ATM cells to all subscriber accommodation nodes 4a and 4b, the image information distribution network 6 distributes the ATM cells. An optical splitter 35 is installed in the line terminator 33a which is a passive element. Either image information distribution node 3 may be used in the image information distribution system of the invention.

Figure 5:
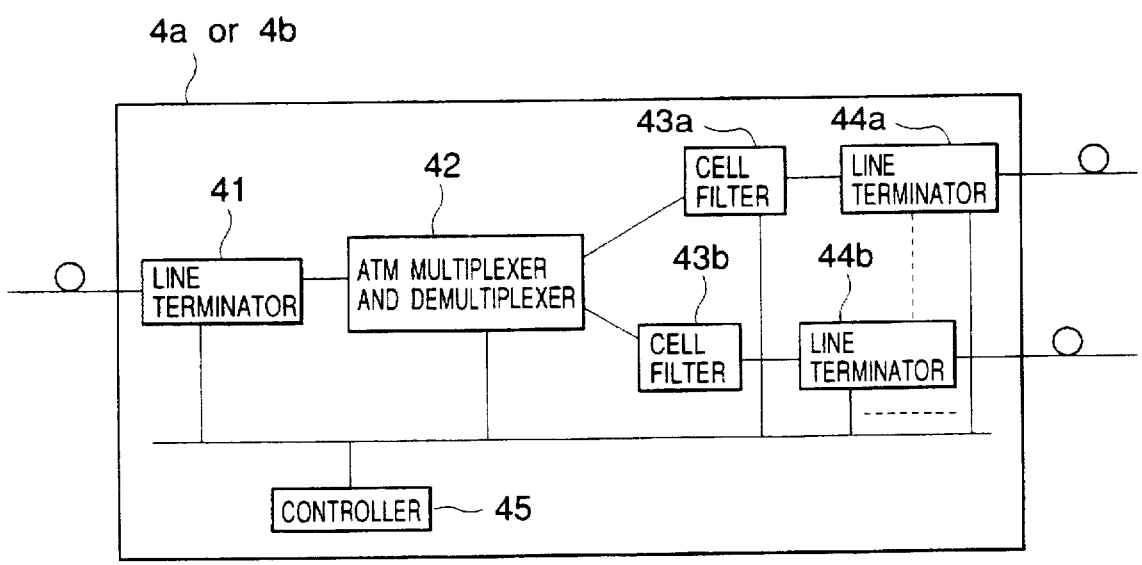
FIG. 5 is a block diagram showing one configuration of subscriber accommodation nodes used with the image information distribution system of the invention.
Figure 6:
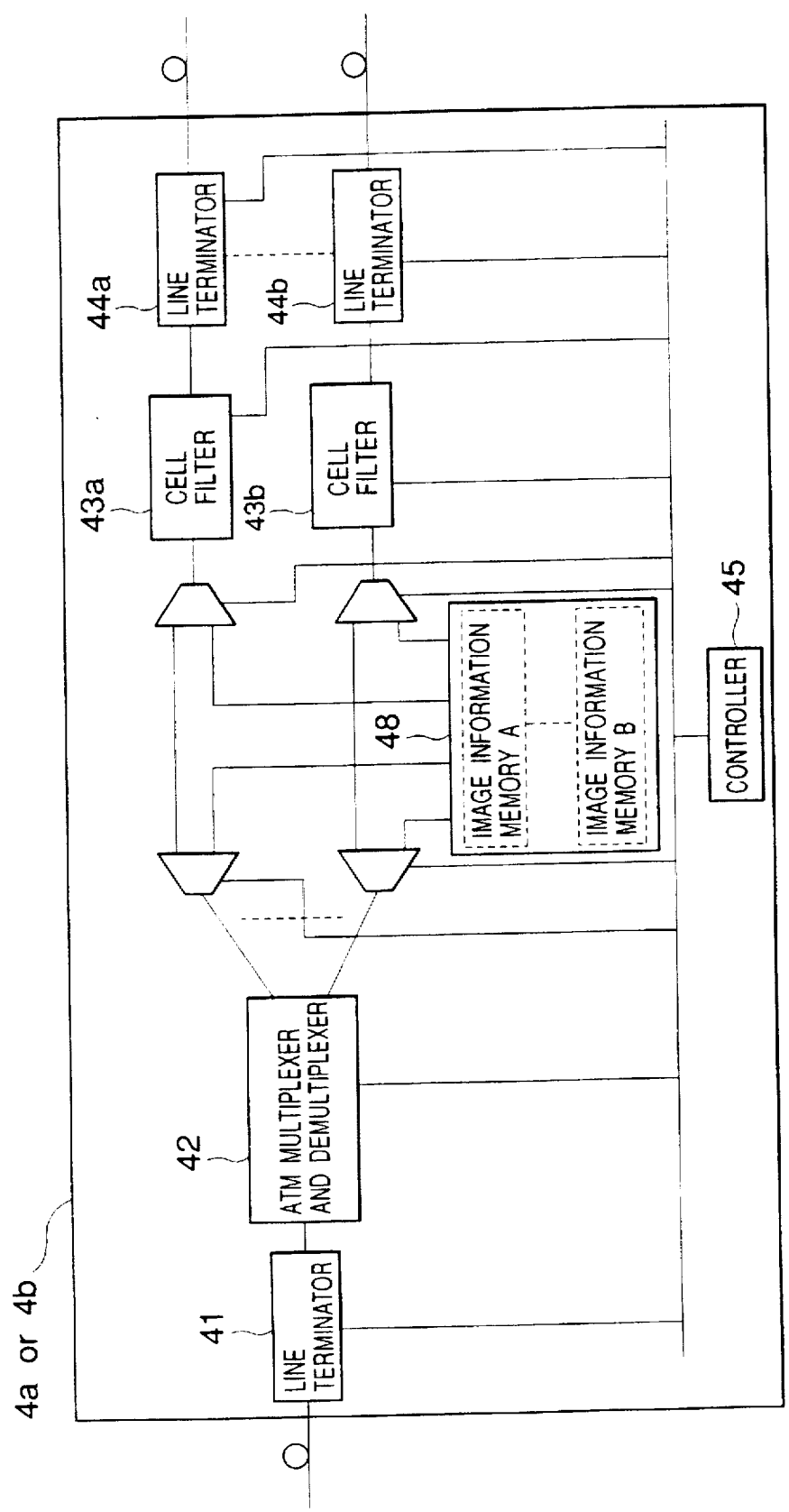
FIG. 6 is a block diagram showing another configuration of subscriber accommodation nodes used with the image information distribution system of the invention.

FIGS. 5 and 6 are block diagrams showing configuration examples of the subscriber accommodation nodes 4a and 4b, each of which comprises an ATM multiplexer and demultiplexer 42 for distributing ATM cells, line terminators 41, 44a, and 44b interfacing with ATM lines, cell filters 43a and 43b for extracting only ATM cells containing image information requested by each subscriber, and a controller 45 for controlling the entire subscriber accommodation node 4a or 4b.

The subscriber accommodation node 4a or 4b in FIG. 6 is a configuration example in which the node contains the image information memory 48 for temporarily holding image information in correspondence with the service to be offered, rather than the image information providing nodes 1a or 1b containing the image information memories 13a and 13b as described above. The image information memory 48 is disposed via distributors 46a and 46b and selectors 47a and 47b between the ATM multiplexer and demultiplexer 42 and the cell filters 43a and 43b. In the image information distribution system of the invention, the image information memory for temporarily holding image information in correspondence with the service to be offered can be located in the system in response to the system specifications, for example, the hardware scale such as the memory capacity and response speed limitation, for selecting the configuration of the subscriber accommodation nodes 4a and 4b.

Figure 7:
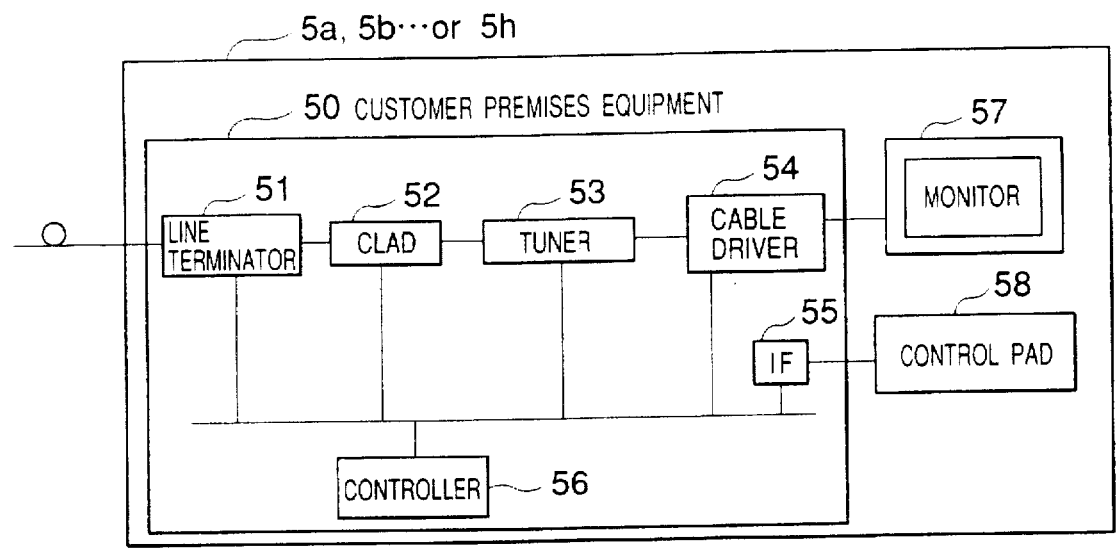
FIG. 7 is a block diagram showing the configuration of customer premises equipment used with the image information distribution system of the invention.

FIG. 7 is a block diagram showing a configuration example of the customer premises equipment of subscribers A 5a to H 5h, which comprises a line terminator 51 which is an interface with an ATM line, a CLAD 52 for converting ATM cells into the image information format, a tuner 53 for converting image information into the format in which the image information can be displayed on a monitor 57 (in the embodiment, information compressed in a system such as MPEG2 is enlarged and converted into a monitor input signal such as an NTSC signal), a cable driver 54, an interface with the monitor 57, a control pad 58 for the subscriber to input a request to the system through an interface 55, and a controller 56 for controlling the entire customer premises equipment. Each of the subscribers A 5a to H 5h uses the control pad 58 connected to the customer premises equipment to perform operations such as image information retrieval. The customer premises equipment converts the input into a control signal and sends the control signal to the system, then displays image information returned from the image information providing node 1a or 1b in response to the request on the monitor 57, thereby providing an image providing service using the image information distribution system of the invention.

Figure 8:
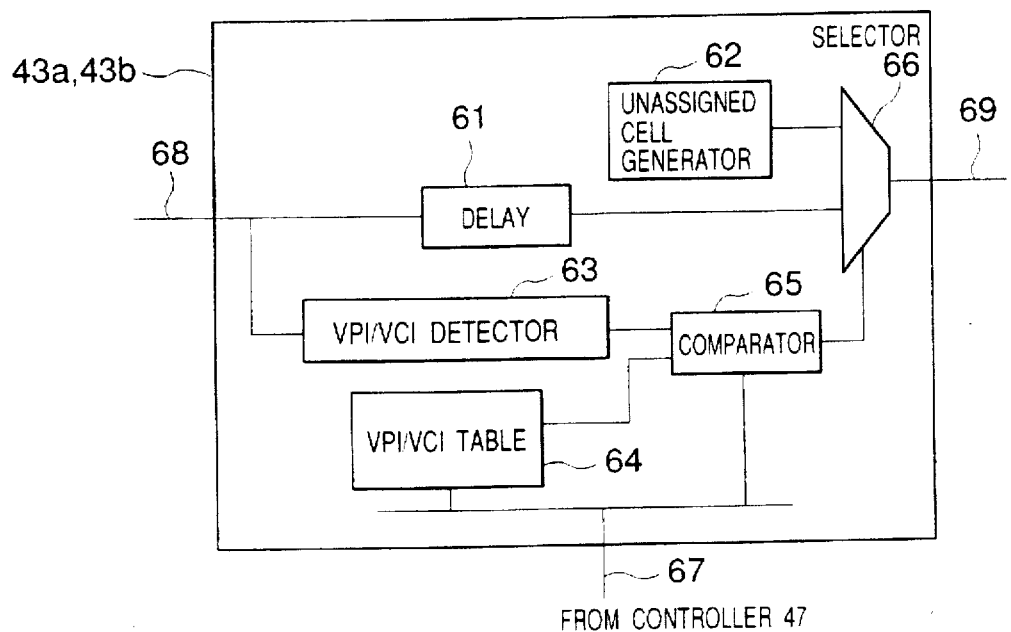
FIG. 8 is a block diagram showing the configuration of a cell filter used with the image information distribution system of the invention.

FIG. 8 is a block diagram showing a configuration example of the cell filters 43a and 43b installed in the subscriber accommodation nodes 4a and 4b. The cell filters 43a and 43b each comprise a highway 68 for receiving ATM cells from the ATM multiplexer and demultiplexer 42, a VPI/VCI detector 63 for detecting a virtual path identifier (VPI) and a virtual channel identifier (VCI) in an ATM cell, a VPI/VCI table 64 for registering the VPI and VCI of the ATM cell containing the image information requested by each subscriber, a comparator 65 for comparing the VPI and VCI detected by the detector 63 with those registered in the table 64, a delay circuit 61 for delaying an ATM cell for the time corresponding to the operation time of the comparator 65, an unassigned cell generator 62 for sending an unassigned ATM cell to the subscriber, and a selector 66 for selectively sending the ATM cell containing the image information requested by each subscriber, or an unassigned ATM cell, to the highway 69 in response to the comparison result of the comparator 65. The cell filter 43a or 43b is controlled by the controller 45 installed in the subscriber accommodation node 4 via a control line 67.

With the cell filter, the controller 45 sets the VPI and VCI of the ATM cell containing the image information requested by each subscriber in the VPI/VCI table 64 and discards ATM cells having VPI or VCI other than the setup identifier, whereby only the image information requested by the subscriber is distributed to the subscriber. More than one VPI/VCI may be set in the table 64. When more than one VPI/VCI is set, two or more ATM cells are sent to the subscriber, in which case the subscriber may be provided with an apparatus for recognizing and properly distributing the ATM cells, such as an ATM switch.

The operation of the image information distribution system according to the invention will be outlined with reference to FIGS. 1 to 8.

(a) Reception of subscriber request

When any of the subscribers A 5a to H 5h operates the control pad 58 for requesting the image information providing node 1a or 1b to send image information, the request is passed through the controller 45 of the subscriber accommodation node 4a or 4b, the controller 34 of the image information distribution node 3, and the repeater node 2, and is terminated at the controller 17 of the image information providing node 1a or 1b. Since the control signal indicating the subscriber request contains a smaller quantity of information compared with image information, the control signal may be transferred on a discrete line or a common line (not shown) of Common Channel Signaling No.7 of CCITT Recommendations in addition to the method of multiplexing to an ATM cell on the upstream ATM line shown in FIG. 1 (information transmission line from the subscriber to the image information providing node) for transmission.

(b) Providing and distributing image information (i) When the controller 17 of the image information providing node 1a or 1b recognizes the image information sending request made by the subscriber A 5a to H 5h from the input control signal, it selects the image information requested by the subscriber A 5a to H 5h from the image information storage unit 11a or 11b by the selector 12a or 12b. If the image information is image information offered for each subscriber as in the video on demand (VOD) or image information that can be handled from the subscriber, it is copied into the image information memory 13a or 13b corresponding to ATM connection to the subscriber A 5a to H 5h (corresponding to the type of image information providing service and the type of provided image information, for example, program channel) via a high-speed interface such as a high performance parallel interface (HIPPI). For any other information, the image information memories 13a and 13b may remain unused. Further, the VPI corresponding to the type of image information providing service and the VCI corresponding to the type of provided image information, for example, program channels are defined. The CLAD 14a or 14b converts the image information into the ATM cell format and the multiplexer 15 multiplexes it with ATM cells carrying other image information. If the controller 17 must send a control signal to another node or subscriber, the control signal is inserted by the multiplexer 15 and sent out from the line terminator 16 to the downstream ATM line shown in FIG. 1 (information transmission line from the image information providing node to the subscriber). The sent-out image information and control signal are sent via the repeater node 2, if present, to the image information distribution node 3. The control signal may also be transmitted on another line such as in the upstream transmission.

(ii) To distribute ATM cells from the image information distribution node 3 to the subscriber accommodation node 4a or 4b connected thereto, one of the two types of image information distribution node 3 described above is selected and (1) the ATM cell is distributed at the image information distribution node 3 shown in FIG. 3 to all subscriber accommodation nodes 4a and 4b (in this case, the ATM multiplexer and demultiplexer 32 distributes the ATM cell); or (2) the ATM cell is distributed in the image information distribution network 6 to all subscriber accommodation nodes 4a and 4b (in this case, in the image information distribution network 6, the optical splitter 35 shown in the image information distribution node 3 in FIG. 4 distributes the ATM cell passively).

(iii) The image information distributed to the subscriber accommodation nodes 4a and 4b is input via each line terminator 41 to each ATM multiplexer and demultiplexer 42, which then distributes it to the lines corresponding to the subscribers A 5a to H 5h accommodated in the subscriber accommodation nodes 4a and 4b. The ATM multiplexer and demultiplexer 42 basically distributes all received ATM cells to the ATM lines corresponding to all subscribers. At the cell filters 43a and 43b following the ATM multiplexer and demultiplexer 42, the VPI and VCI in each ATM cell are detected by the detector 63 and compared with those set in the VPI/VCI table 64 by the comparator 65. If the ATM cell does not have VPI/VCI set in the VPI/VCI table 64, it is discarded (an unassigned cell has been sent). If the ATM cell has the same VPI/VCI as set in the VPI/VCI table 64, the received ATM cell delayed by the delay circuit 61 is selected for passing only the ATM cell having the VPI/VCI containing the image information requested by the subscriber. Then, the ATM cell is sent out via the line terminator 44a, 44b to the subscriber A 5a to H 5h. If the image information memory 48 corresponding to ATM connection is installed in the subscriber accommodation node shown in FIG. 6 in place of the image information memories 13a and 13b in the image information providing nodes 1a and 1b, image information transmitted from the image information providing node 1a or 1b is stored in the image information memory 48 to provide the video on demand (VOD) service, etc. Depending on the type of image information service, image information is sent out via the cell filter 43a, 43b from the line terminator 44a, 44b to the subscriber A 5a to H 5h without using the image information memory 48.

(iv) The customer premises terminal 50 uses the CLAD 52 for converting the image information and control signal received in the ATM cell form into the original image information and control signal. The image information having been transmitted in the compression format is enlarged in the tuner 53 and converted into the television signal format by the cable driver 54, then sent to the monitor 57. The subscriber uses the monitor 57 to watch the image information. To select other image information, the subscriber uses the control pad 58 shown in FIG. 7.

Thus, according to the image information distribution system of the invention, a virtual path VP is defined corresponding to the type of image information providing service and a virtual channel VC corresponding to the type of provided image information, for example, a program channel is defined in the VP, whereby ATM connection is set. That is, connection is not set for each subscriber, so that the VP and VC for providing the image information can be used in common and network resources can be saved. (For example, as many VPs as the number of services may be set between the image information providing and distribution nodes.) Further, since VP and VC are used in common, their setting sequence can be simplified. Cell filters are provided corresponding to the subscribers at the nodes near the subscribers for selecting only the image information requested by the subscriber and providing it for the subscriber. In the network, image information is provided using a VP and VC used in common, and broadcast to the nodes at which the cell filters are installed. Therefore, the controller needs only to set the cell filter in response to a subscriber's request, which means that control of ATM connection setting,.etc., in the network can be simplified and a system with saved network resources under simple control can be configured.

According to the configuration and operation of the image information distribution system of the invention as described above, various image information providing services can be offered, such as general television broadcasting, the pay per view (PPV) service for a subscriber to pay a toll on a pay-per-view basis, and the video on demand (VOD) service which enables a subscriber to view any desired image information stored in the image information providing nodes at any desired time.

Embodiments of various image information providing services using the image information distribution system will be discussed.

First, an embodiment for the image information providing node A 1a to offer a general broadcasting service to subscribers C 5c to F 5f will be discussed as an embodiment of a general broadcasting service. Specifically, a signal flow when programs on television channels α1 and α2 selected by the subscribers C 5c to F 5f operating their control pads 58 (FIG. 7) are sent out to the subscribers from the image information providing node A 1a in the following sequence will be described with reference to FIG. 1.

(a) After the controller 17 in FIG. 2, at the image information providing node A 1a, recognizes that the general broadcasting service is requested and identifies the television channels to be provided from the control signals received from the subscribers, virtual path VP 8b for the general broadcasting service is set in the image information distribution node 3 via the repeater node 2 from the image information providing node A 1a, and is set in the subscriber accommodation nodes A 4a and B 4b through the image information distribution network 6 from the image information distribution node 3.

Further, virtual channels VCs 7b and 7c are set in the virtual path VP 8b corresponding to the programs and general broadcasting television channels α1 and α2 are assigned to the virtual channels VCs 7b and 7c. Here, the virtual channels VCs 7b and 7c in the virtual path VP 8b are set in a point-to-point manner from the image information providing node A 1a to the image information distribution node 3 and set in a point-to-multipoint manner from the image information distribution node 3 to the subscriber accommodation nodes A 4a and B 4b. That is, the image information is broadcast from the image information distribution node 3 to the subscriber accommodation nodes 4a and 4b. The image information received at the image information distribution node 3 is all received at the subscriber accommodation nodes 4a and 4b.

(b) At the subscriber accommodation nodes 4a and 4b, only virtual channels VCs requested by the subscribers accommodated in the subscriber accommodation nodes 4a and 4b are selected, by discarding virtual channels not watched by the subscribers through the cell filters 43a and 43b in FIG. 5 or 6. Since the subscribers C, D, and E request the television channel α1 and the subscriber F requests the channel α2 in the embodiment, the cell filters corresponding to the subscribers C, D, and E can select only the VC 7b for receiving channel α1 assigned to the VC 7b and the cell filter corresponding to the subscriber F can select only the VC 7c for receiving channel α2 assigned to the VC 7c.

Figure 9:
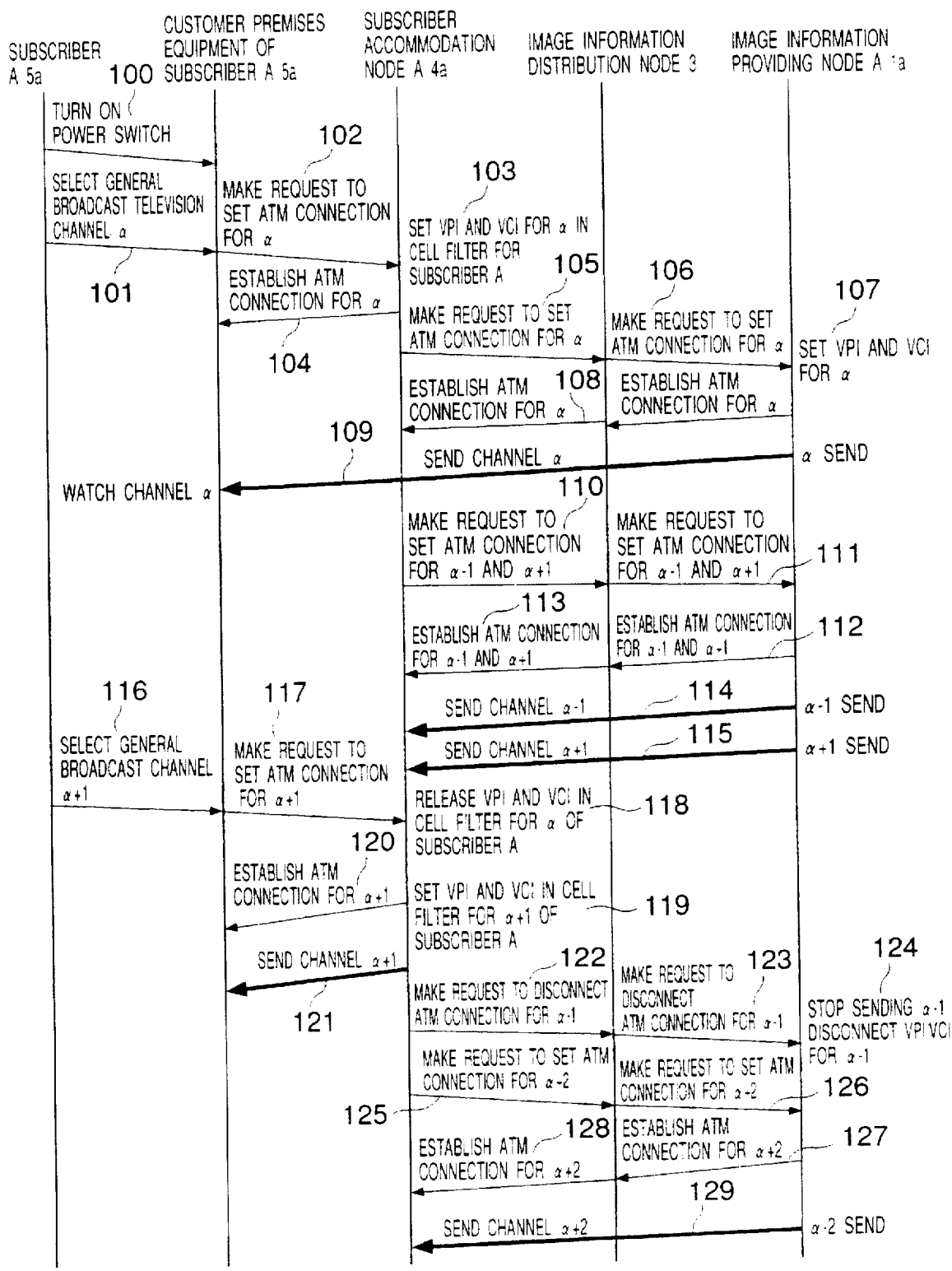
FIG. 9 is a sequence chart of one image providing service operation performed by the image information distribution system of the invention.

Next, the operation of the image information distribution system for one subscriber to watch general broadcast α and then general broadcast α+1 will be discussed as another embodiment of the general broadcasting service, with reference to FIG. 9, which is an operation sequence chart showing the embodiment of the general broadcasting service offered by the image information distribution system of the invention. FIG. 9 shows transfer of image information and control information required for one subscriber to watch general broadcast α and then general broadcast α+1.

(a) When the subscriber A 5a turns on a power switch (not shown) of the customer premises equipment 50, shown in FIG. 7, at 100 and operates the control pad 58, also sown in FIG. 7, for selecting general broadcast television channel α at 101, the customer premises equipment 50 requests the subscriber accommodation node A 4a to set ATM connection for television channel at 102. Then, the subscriber accommodation node A 4a sets the VPI and VCI of the ATM cell carrying the television channel α in the cell filter 43, shown in FIG. 5 or 6, for the subscriber A at 103. The ATM connection for the television channel α is now established between the customer premises equipment of the subscriber A and the subscriber accommodation node A at 104.

(b) The subscriber accommodation node A 4a requests the image information distribution node 3 to set ATM connection at 105. Then, the image information distribution node 3 requests the image information providing node A 1a to set ATM connection at 106. The image information providing node A 1a sets VPI and VCI and establishes the ATM connection between the image information providing node A 1a and the image information distribution node 3 at 107.

Subsequently, the image information distribution node 3 sets VPI and VCI and establishes the ATM connection between the image information distribution node 3 and the subscriber accommodation node A 4a at 108. Thus, the ATM connection is established between the image information providing node A 1a and the customer premises equipment 50 of the subscriber A 5a and a program on the television channel α (image information) is sent out from the image information providing node A 1a to the customer premises equipment 50 at 109, enabling the subscriber A 5a to watch the program on the television channel α on the monitor 57 shown in FIG. 7.

(c) In the image information distribution system of the invention, after setting the ATM connection for sending the television channel α, the subscriber accommodation-node A 4a further requests the image information distribution node 3 to set ATM connection for receiving television channels α-1 and α+1, preceding and following the television channel α requested by the subscriber A 5a at 110. The image information distribution node 3 requests the image information providing node A 1a to set the ATM connection for transmitting the television channels α-1 and α+1 at 111. When receiving the request, the image information providing node A 1a sets VPI and VCI and establishes the ATM connection from the image information providing node A 1a to the image information distribution node 3 at 112. Subsequently, the image information distribution node 3 sets VPI and VCI and establishes the ATM connection from the image information distribution node 3 to the subscriber accommodation node A 4a at 113. As a result, programs on the television channels α-1 and α+1 are sent out from the image information providing node A 1a to the subscriber accommodation node A 4a through the ATM connection at 114 and 115. However, at this point in time, the VPI and VCI indicating the television channel α-1 or α+1 are not yet registered in the VPI/VCI table 64, shown in FIG. 8, in the cell filter at the subscriber accommodation node A 4a. Therefore, the programs on the television channels α-1 and α+1 are not sent out to the customer premises equipment of the subscriber A 5a.

(d) If the subscriber A 5a selects the television channel a+1 in this state at 116, a request to set ATM connection for α+1 is sent out from the customer premises equipment of the subscriber A 5a to the subscriber accommodation node A 4a at 117. At the subscriber accommodation node A 4a, the VPI/VCI table 64 for the television channel αα in the cell filter for the subscriber A 5a is reset at 118 and the VPI and VCI of the ATM cell carrying the television channel α+1 are set at 119, whereby the ATM connection for the television channel α+1 is established from the subscriber accommodation node A 4a to the customer premises equipment of the subscriber A 5a at 120.

According to the image information distribution system of the invention, since the subscriber accommodation node A 4a already receives the program on the television channel α+1 in the preceding sequence 115, the ATM connection for the television channel α+1 is established simply by negotiation with the subscriber accommodation node A 4a without sending out the control signal to the image information providing node A 1a. The program on the television channel α+1 can be received in a short time.

(e) The subscriber accommodation node A 4a sets the cell filter to receive the television channel α+1, then sends out a request to disconnect the ATM connection for α-1 to the image information distribution node 3 at 122. The image information distribution node 3 sends the ATM connection disconnection request to the image information providing node A 1a at 123. The subscriber accommodation node A 4a sends out a request to set ATM connection for α+2 to the image information distribution node 3 at 125. The image information distribution node 3 sends the ATM connection setting request for α+2 to the image information providing node A 1a at 126. The ATM connection for α+2 is established from the image information providing node A 1a to the image information distribution node 3 at 127. The ATM connection is established from the image information distribution node 3 to the subscriber accommodation node A 4a. The television channel α+2 is sent out through the ATM connection at 129. Since the VPI and VCI of the ATM cell carrying the television channel α+2 are not yet registered in the VPI/VCI table 64 in the cell filter for the subscriber A 5a at the subscriber accommodation node A 4a, the program on the television channel α+2 is not sent out to the customer premises equipment of the subscriber A 5a as in (c) above. We have discussed the sequence executed for the subscriber A 5a to watch general broadcast α and then general broadcast α+1. The control signals for executing the sequence can be transferred in the Common Channel Signaling system or on a discrete line.

Figure 10:
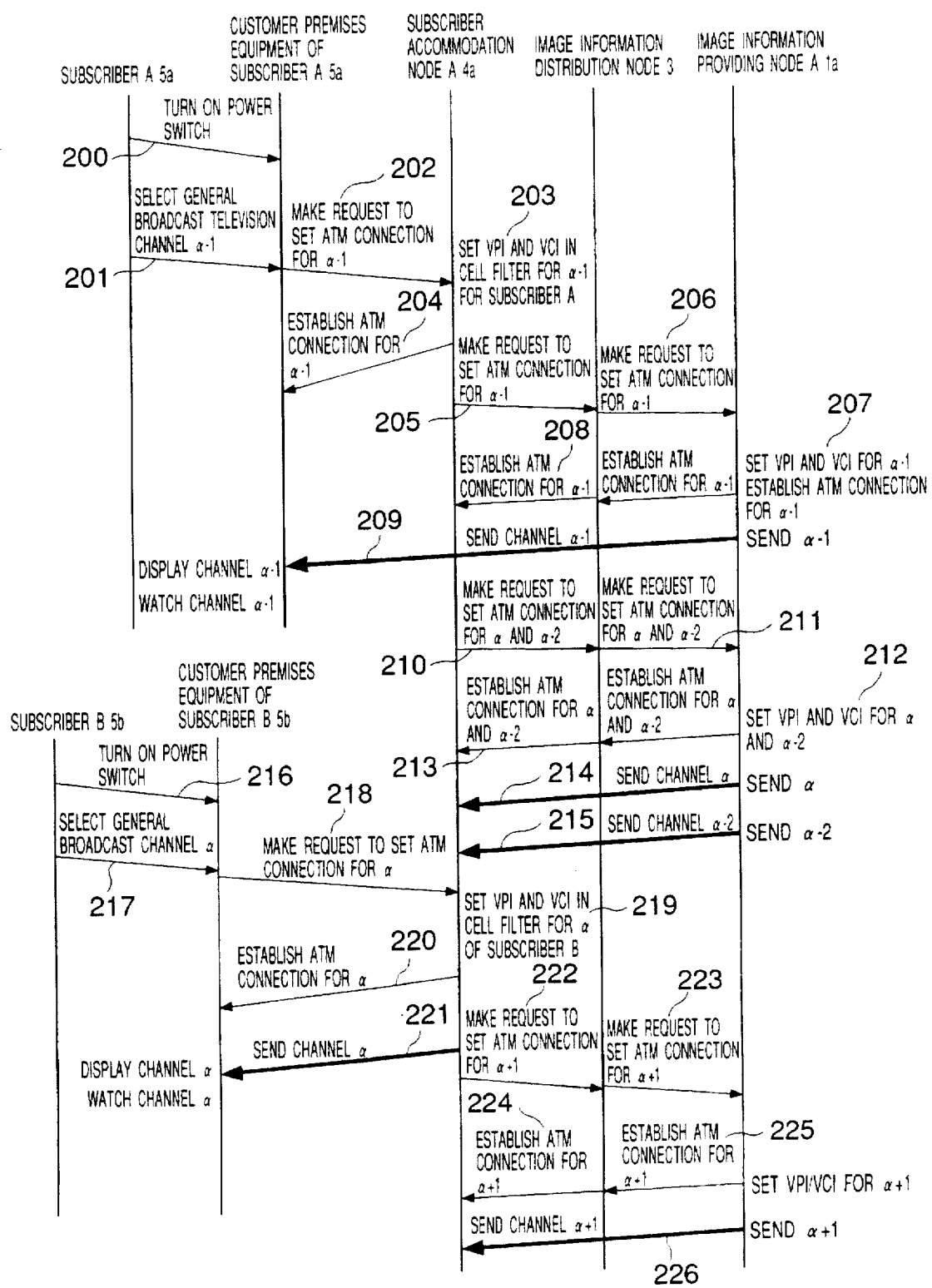
FIG. 10 is a sequence chart of another image providing service operation performed by the image information distribution system of the invention.

The operation of another embodiment of the general broadcasting service offered by the image information distribution system of the invention will be discussed with reference to FIG. 10, which is an operation sequence chart showing the embodiment of the general broadcasting service offered by the image information distribution system of the invention. It shows the operation sequence being executed, while the subscriber A 5a belonging to the subscriber accommodation node A 4a is watching a program on general broadcast television channel α−1, for another subscriber B 5b belonging to the same subscriber accommodation node A 4a to select and watch a program on television channel α.

(a) When the subscriber A 5a turns on the power switch (not shown) of the customer premises equipment at 200 and selects general broadcast television channel α−1 at 201, the customer premises equipment requests the subscriber accommodation node A 4a to set ATM connection for television channel α−1 at 202.

Then, the controller 45 shown in FIG. 5 or 6, of the subscriber accommodation node A 4a sets the VPI and VCI of the ATM cell carrying the television channel α−1 in the VPI/VCI table 64 of the cell filter for the subscriber A 5a at 203. The ATM connection for the television channel α−1 is now established between the subscriber accommodation node A 4a and the customer premises equipment of the subscriber A 5a at 204. The operation is similar to the operation (a) previously described with reference to FIG. 9.

(b) The subscriber accommodation node A 4a requests the image information distribution node 3 to set ATM connection for α−1 at 205. Then, the image information distribution node 3 requests the image information providing node A 1a to set ATM connection to carry the television channel −1 at 206. The image information providing node A 1a sets VPI and VCI and establishes the ATM connection for α−1 between the image information providing node A 1a and the image information distribution node 3 at 207. Subsequently, the image information distribution node 3 sets VPI and VCI and establishes the ATM connection for α−1 between the image information distribution node 3 and the subscriber accommodation node A 4a at 208. Through the ATM connection thus established, the television channel α−1 is sent out from the image information providing node A 1a to the subscriber accommodation node A 4a at 209.

(c) As in the preceding embodiment, after sending out the television channel α−1, the subscriber accommodation node A 4a executes a sequence for requesting the image information providing node A 1a to send television channels α−2 and α preceding and following the television channel α−1 through the image information distribution node 3. That is, the subscriber accommodation node A 4a requests the image information distribution node 3 to set ATM connection for television channels α and α−2 at 210. The image information distribution node 3 requests the image information providing node A 1a to set the ATM connection for carrying the television channels α and α−2 at 211. When receiving the request, the image information providing node A 1a sets VPI and VCI and establishes the ATM connection for α and α−2 from the image information providing node A 1a to the image information distribution node 3 at 212. Subsequently, the image information distribution node 3 sets VPI and VCI and establishes the ATM connection for α and α−2 from the image information distribution node 3 to the subscriber accommodation node A 4a at 213. Information on the television channels α and α−2 is sent out from the image information providing node A 1a to the subscriber accommodation node A 4a, through the established ATM connection at 214 and 215. However, at this point in time, the VPI and VCI for the television channels α and α−2 are not yet set in either of the cell filters 43a or 43b, shown in FIG. 5 or 6, at the subscriber accommodation node A 4a. Therefore, the subscriber A 5a cannot receive the program on the television channel α or α−2.

(d) In this state, if the subscriber B 5b belonging to the same subscriber accommodation node A 4a turns on the power switch of the customer premises equipment at 216 and selects the general broadcast television channel α at 217, the customer premises equipment of the subscriber B 5b requests the subscriber accommodation node A 4a to set ATM connection for the television channel α at 218. The controller 45 of the subscriber accommodation node B 4b sets the VPI and VCI of the ATM cell carrying the television channel α in the VPI/VCI table 64 of the cell filter for the subscriber B 5b at 219, whereby the ATM connection is established between the subscriber accommodation node A 4a and the customer premises equipment of the subscriber B 5b at 220. According to the image information distribution system of the invention, since the subscriber accommodation node A 4a is already receiving the program on the television channel α through the sequence (214) set by the subscriber B 5b, the subscriber B 5b can receive the program on the television channel α in a short time at 221 by simply establishing the ATM connection at 220.

(e) The subscriber accommodation node A 4a executes a sequence for receiving the television channels α−1 and α+1 preceding and following α as in the preceding embodiment. Since α−1 is already received at 209, a sequence for receiving α+1 (222-226) is executed. The VPI/VCI table of the cell filter for the subscriber B 5b at the subscriber accommodation node A 4a is set so as to allow only the ATM cell containing the image information on the television channel cc to pass through, so that the subscriber B 5b watches only the television channel α.

Figure 11:
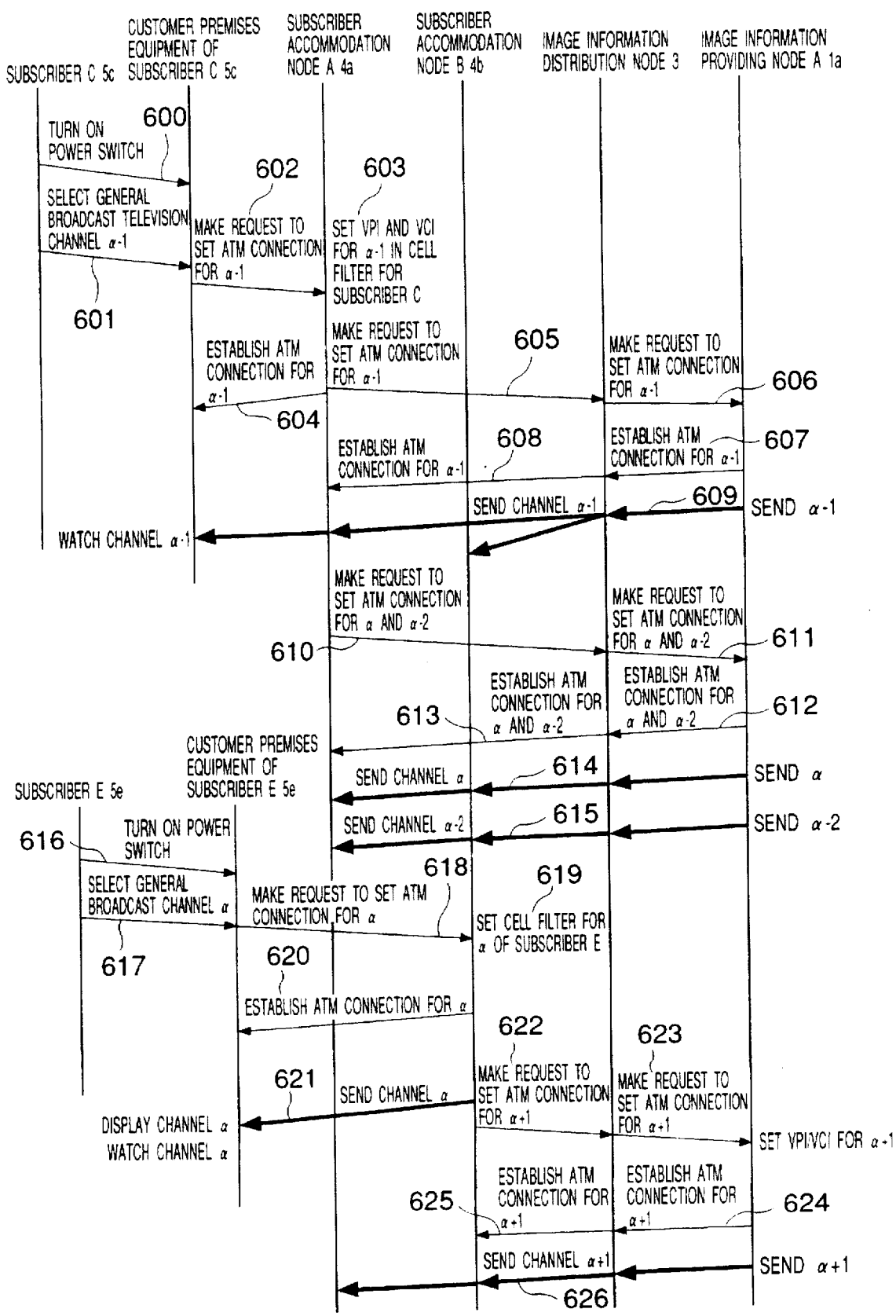
FIG. 11 is a sequence chart of another image providing service operation performed by the image information distribution system of the invention.

The operation of another embodiment of the general broadcasting service offered by the image information distribution system of the invention will be discussed with reference to FIG. 11, which is an operation sequence chart showing the embodiment of the general broadcasting service offered by the image information distribution system of the invention. It shows the operation sequence executed, while the subscriber C 5c belonging to the subscriber accommodation node A 4a is watching a program on general broadcast television channel α−1, for the subscriber E 5e belonging to another subscriber accommodation node B 4b to select and watch a program on television channel α.

(a) When the subscriber C 5c turns on the power switch of the customer premises equipment at 600 and selects general broadcast television channel α-1 at 601, the customer premises equipment requests the subscriber accommodation node A 4a to set ATM connection for television channel α-1 at 602. Then, the controller 45 of the subscriber accommodation node A 4a sets the VPI and VCI of the ATM cell carrying the television channel α-1 in the VPI/VCI table 64 of the cell filter for the subscriber C 5c at 603. The ATM connection for the television channel α-1 is now established between the subscriber accommodation node A 4a and the customer premises equipment of the subscriber C 5c at 604.

(b) The subscriber accommodation node A 4a requests the image information distribution node 3 to set ATM connection for α-1 at 605. Then, the image information distribution node 3 requests the image information providing node A 1a to set ATM connection to carry the television channel α-1 at 606. The image information providing node A 1a sets VPI and VCI and establishes the ATM connection for α-1 between the image information providing node A 1a and the image information distribution node 3 at 607. Subsequently, the image information distribution node 3 sets VPI and VCI and establishes the ATM connection for α-1 between the image information distribution node 3 and the subscriber accommodation node A 4a at 608. Through the ATM connection thus established, the television channel α-1 is sent out from the image information providing node A 1a to the subscriber accommodation node A 4a at 609. In the image information distribution network 6, the lines are set in a point-to-multipoint manner, as described above. The ATM cell carrying the image information on the television channel α-1 is also distributed from the image information distribution node 3 to the subscriber accommodation node B 4b at the same time at 609.

(c) As in the preceding embodiment, after sending out the television channel α-1, to request the image information providing node A 1a to send television channels α-2 and α preceding and following the television channel α-1 through the image information distribution node 3, the subscriber accommodation node A 4a requests the image information distribution node 3 to set ATM connection for television channels α and α-2 at 610. The image information distribution node 3 requests the image information providing node A 1a to set the ATM connection for carrying the television channels α and α-2 at 611. When receiving the request, the image information providing node A 1a sets VPI and VCI and establishes the ATM connection for α and α-2 from the image information providing node A 1a to the image information distribution node 3 at 612. Subsequently, the image information distribution node 3 sets VPI and VCI and establishes the ATM connection for the television channels α and α-2 from the image information distribution node 3 to the subscriber accommodation node A 4a at 613. Programs on the television channels α and α-2 are sent out from the image information providing node A 1a to the subscriber accommodation node A 4a through the established ATM connection at 614 and 615. As in the preceding embodiment, at this point in time, the VPI and VCI for the television channels α and α-2 are not yet set in either the cell filters 43a or 43b in the subscriber C 5c at the subscriber accommodation node A 4a. Therefore, the subscriber C 5c cannot receive the television channel α or α-2.

(d) In this state, if the subscriber E 5e belonging to the subscriber accommodation node B 4b turns on the power switch of the customer premises equipment at 616 and selects the general broadcast television channel α at 617, the customer premises equipment of the subscriber E 5e requests the subscriber accommodation node B 4b to set ATM connection for the television channel α at 618. The controller 45 of the subscriber accommodation node B 4b sets the VPI and VCI of the ATM cell carrying the television channel α in the VPI/VCI table 64 of the cell filter for the subscriber E 5e at 619, whereby the ATM connection is established between the subscriber accommodation node B 4b and the customer premises equipment of the subscriber E 5e at 620. According to the image information distribution system of the invention, since the subscriber accommodation node B 4b is already receiving the television channel α as a result of the sequence (614) set by the subscriber C 5c, the subscriber E 5e can receive the program on the television channel α at 621 by simply establishing the ATM connection at 620.

(e) The subscriber accommodation node B 4b executes a sequence for receiving the television channels α-1 and α+1 preceding and following the received television channel α. Since the television channel α-1 is already being received at 609, a sequence for receiving the television channel α+1 (622–626) is executed. The VPI/VCI table of the cell filter for the subscriber E 5e at the subscriber accommodation node B 4b is set so as to allow only the ATM cell containing the image information on the television channel α to pass through, so that the subscriber E 5e watches only the television channel α.

We have discussed the embodiments of the general broadcasting service offered by the image information distribution system of the invention, wherein a virtual path VP corresponding to the type of image information providing service is set on ATM lines and a virtual channel VC corresponding to the type of provided image information is set in the VP for transmission of image information with an ATM cell. That is, since ATM connection corresponding to the provided image information is established, if the subscribers belonging to the image information distribution node 3 request the same television channel, it can be transmitted through one ATM connection from the image information providing node 1a, 1b to the image information distribution node 3. The utilized transmission capacity can be reduced compared with a system in which separate ATM connection is set for each subscriber and the same image information is transmitted separately through each ATM connection.

In the general broadcasting service, to change television channels, the subscriber operates the control pad 58, and the controller 56 converts it into a control signal and sends a television channel change request. The control signal from the subscriber is received by the controller at each node, then the current television channel is changed to the channel desired by the subscriber and a new program is sent out. However, if the control signal is relayed at a number of nodes, a long delay develops. It takes time from the subscriber sending out a television channel change request to television channels actually being changed. To shorten the time, the invention takes advantage of the fact that most television channel number systems have a cyclically easy-to-change structure, such 1, 2, 3 ... 12, 1, 2, 3 ... That is, when changing television channels, the subscriber often changes the current television channel to its preceding or following television channel, for example, television channel α-1 or α+1 if they are watching television channel α at the time. Thus, when the subscriber requests watching the television channel α, the image information distribution node 3 requests the image information providing node to also send the television channels α-1 and α+1 preceding and following the television channel α in addition to the television channel α. Therefore, if the subscriber who is watching the television channel changes it to the television channel α−1 or α+1, the television channels α−1 and α+1 are already received at the subscriber accommodation nodes 4a and 4b. Thus, the control signal can be transferred only between the subscriber and the subscriber accommodation node 4a, 4b. If the subscriber who is watching the television channel a changes it to the television channel α+1, the image distribution node 3 receives the television channels preceding and following the television channel α+1, namely, receives α+2 and α in addition to α+1. If no subscribers belonging to the image information distribution node 3 watch the television channel α−1, a request to disconnect the television channel is transmitted to the image information providing node 1a, 1b. This configuration enables high-speed television channel change compared with the configuration in which the control signal for a television channel change request is relayed to the image information providing node 1a; 1b. Of course, if programs are not assigned to all television channels, television channels near the current television channel being watched may be selected and received.

In the embodiments, one television channel preceding and one television channel following the current television channel selected by the subscriber are selected and received, but two or more television channels preceding and following the current television channel selected by the subscriber may be selected and received. Further, as alternative methods whereby programs on television channels other than the television channel requested by the subscriber are previously received at the subscriber accommodation node for enabling high-speed television channel change, programs can be classified into groups according to the contents, such as news, sport, and music, and when the subscriber selects a program belonging to one group, the system previously selects other programs belonging to the group and receives them at the subscriber accommodation node, or in contrast, some programs in any group other than the television channel group selected by the subscriber are previously selected and received at the subscriber accommodation node. Programs having a high audience rating can also be previously selected and received.

Such control can be easily provided-simply by changing the television channel numbers using a procedure similar to the procedures in the embodiments or repeating the procedure, for example, using a system management and administration feature or the like (not shown) provided with functions of previously storing the television channel numbers providing the programs, specifying the number of previously received television channels, previously registering the contents of programs to be provided (kinds, etc.,), and managing the audience ratings, use state, etc. When starting use of the customer premises equipment, the subscriber may inform the system of these items of information and the system performs control based on the information.

In any event, the image information distribution system of the invention does not establish ATM connection for each subscriber and establishes ATM connection corresponding to the image information to be provided. Thus, although other programs are previously selected and received at the subscriber accommodation node, the system can reduce the utilized transmission capacity compared with a system which transmits the same image information through separate ATM connection. Moreover, the system of the invention transmits image information up to the node near the subscriber, so that the number of control information items transferred between the subscriber and the system, and procedures for the subscriber to receive the image information, can be simplified. So, the system can provide a program with quick response to a subscriber's channel change request, so as to be realized an economical and easy-to-use broadcasting service. Further, since ATM connection corresponding to the image information to be provided is established, quality control of the image information may be performed in the unit. Compared with quality control for each subscriber, simplified and economical image quality control can be performed and high-quality image information without image quality variations from one subscriber to another can be provided for each subscriber.

Embodiments of a pay per view (PPV) service offered by the image information distribution system of the invention will be discussed. The PPV service is broadcasting of the type wherein the subscriber pays a toll per view of programs broadcasted in a determined period from the image information providing node. More specifically, the subscriber sends a request to watch a PPV service television channel to the image information providing node before the PPV program starts, waits for the program to start, and watches it when the program starts. The subscriber may be charged for a PPV program when he or she watches the program for a specified time or longer or may be charged for a PPV program strictly based on the veiwing time.

First, an embodiment for the image information providing node A 1a to offer the PPV service to subscribers A 5a and B 5b will be discussed as an embodiment of the PPV service. Specifically, a signal flow when the subscribers A 5a and B 5b operate their control pads 58 shown in FIG. 7 for sending a PPV service request to the image information providing node A 1a and the image information providing node A 1a sends the requested programs to the subscribers will be described with reference to FIG. 1.

(a) When the controller 17, shown in FIG. 2, at the image information providing node A 1a recognizes that the PPV service is requested from control signals received from the subscribers, a virtual path VP 8a for the PPV service is set in the image information distribution node 3 in a point-to-point manner from the image information providing node A 1a and is set in the subscriber accommodation node A 4a in a point-to-multipoint manner from the image information distribution node 3, and virtual channel VC 7a corresponding to the PPV television channel is set in the VP 8a. That is, ATM connection in which the VP corresponding to the image information providing service and the VC corresponding to the image information are defined is set, as with the general broadcasting service described in the preceding embodiments.

(b) At the subscriber accommodation node A 4a, if the subscribers A 5a and B 5b accommodated in the subscriber accommodation node A 4a request the PPV service, the virtual channel VC 7a is set up to the subscribers A 5a and B 5b for providing the PPV program. The PPV program is not sent to other subscribers C 5c and D 5d who are not requesting the PPV service. Whether or not the PPV program is to be provided is determined by whether or not the VPI and VCI for providing the PPV program are set in the cell filters corresponding to the subscribers at the subscriber accommodation node A 4a in response to subscriber's requests, as with the general broadcasting service described in the preceding embodiments. In the system, although a number of subscribers belonging to the image information distribution node 3 request the same PPV program, it is also transmitted through one ATM connection from the image information providing node A 1a to the image information distribution node 3 and the ATM cell is distributed from the image information distribution node 3 to all subscriber accommodation nodes belonging thereto. Therefore, the transmission line between the image information providing node A 1a to the image information distribution node 3 can be effectively utilized.

Next, an embodiment of the PPV service offered by the image information distribution system of the invention will be discussed.

Figure 12:
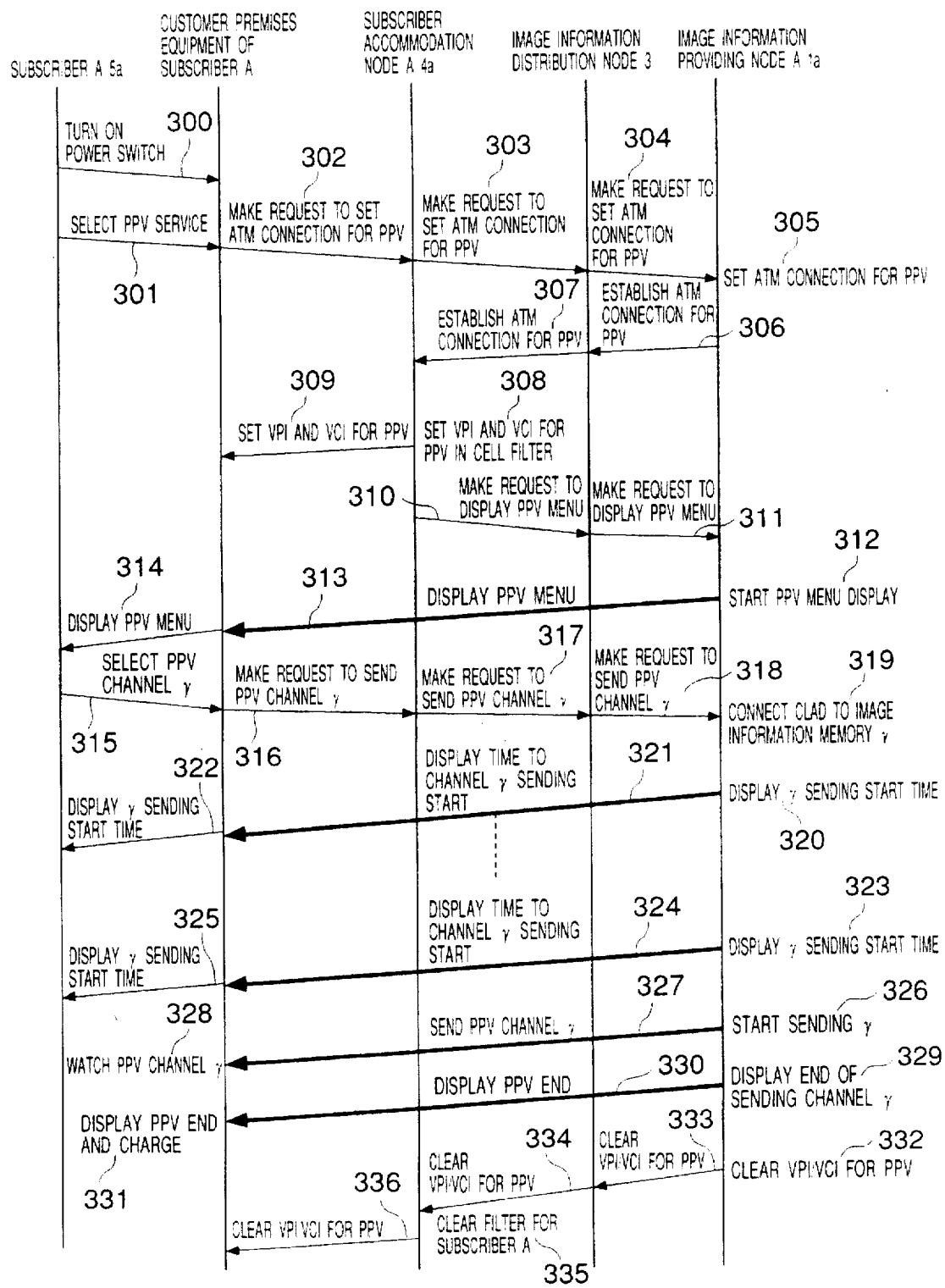
FIG. 12 is a sequence chart of another image providing service operation performed by the image information distribution system of the invention.

FIG. 12 is an operation sequence chart showing the embodiment of the PPV service offered by the image information distribution system of the invention. It shows the operation performed when the subscriber A 5a selects PPV television channel γ and waits for the requested program to start, then watches the television channel γ until the program ends. The operation of the embodiment will be described with reference to FIG. 12.

(a) When the subscriber A 5a turns on the power switch of the customer premises equipment at 300 and operates the control pad 58 shown in FIG. 7 for selecting the PPV service at 301, the customer premises equipment requests the subscriber accommodation node A 4a to set ATM connection for the PPV service at 302. The subscriber accommodation node A 4a requests the image information distribution node 3 to set the ATM connection for the PPV service at 303 and the image information distribution node 3 requests the image information providing node A 1a to set the ATM connection for the PPV service at 304. In response to the request, the image information providing node A 1a starts setting the ATM connection for the PPV service at 305 and establishes the ATM connection for the PPV service for the image information distribution node 3 at 306. After this, the image information distribution node 3 establishes the ATM connection for the PPV service for the subscriber accommodation node A 4a at 307. The controller 45 at the subscriber accommodation node A 4a sets the VPI and VCI of the ATM cell carrying the image information for the PPV service in the VPI/VCI table 64 in the cell filter 43a, 43b at 308. The ATM connection for the PPV service is now established between the subscriber accommodation node A 4a and the customer premises equipment of the subscriber A 5a at 309.

(b) The subscriber accommodation node A 4a requests the image information distribution node 3 to display a PPV service menu at 310. In the embodiment, the image information distribution node 3, which does not yet receive the PPV service, requests the image information providing node A 1a to display a PPV service menu at 311. The image information providing nod-e A 1a starts PPV menu display at 312 and sends the PPV service menu to the customer premises equipment of the subscriber A 5a through the previously established ATM connection for the PPV service at 313. The customer premises equipment of the subscriber A 5a displays the received PPV service menu on the monitor 57 at 314. The subscriber A 5a uses the control pad 58 to select the television channel γ out of the displayed PPV service menu at 315. The customer premises equipment converts the request into a control signal and sends the signal to the subscriber accommodation node A 4a at 316. In the embodiment, the subscriber accommodation node A 4a, which does not yet receive the television channel γ, sends a television channel γ selection request to the image information distribution node 3 at 317, which, in turn, sends the television channel γ selection request to the image information providing node A 1a at 318.

(c) The image information providing node A 1a connects the CLAD 14a or 14b for converting image information into an ATM cell to the image information memory 13a which stores image information on the television channel γ at 319.

As in the embodiment in which the system configuration and operation are previously described with reference to FIGS. 1 to 8, image information can also be sent out from the image information storage unit directly to the CLAD not via the image information memory 13a. While counting down the sending start time of the television channel γ, the controller 17 sends out a screen to the program start, such as the time to the program sending start, and displays it on the monitor 57 of the customer premises equipment at 320–325.

(d) When the start time of the television channel γ is reached, the image information providing node A 1a starts sending the program on the television channel γ at 326. The image information is transmitted through the previously established ATM connection for the PPV service at 327 and the subscriber watches the program on the television channel γ at 328. Upon termination of sending the television channel γ, the image information providing node A 1a displays the end of the television channel γ at 329. It is transmitted through the ATM connection for the PPV service at 330 and the PPV service charge, etc., as well as the end display is displayed on the monitor of the subscriber at 331. Lastly, the image information providing node A 1a, the image information distribution node 3, and the subscriber accommodation node A 4a disconnect the ATM connection and clear the contents of the VPI/VCI table in the cell filter at 332–336.

Next, a different embodiment of the PPV service offered by the image information distribution system of the invention will be discussed.

Figure 13:
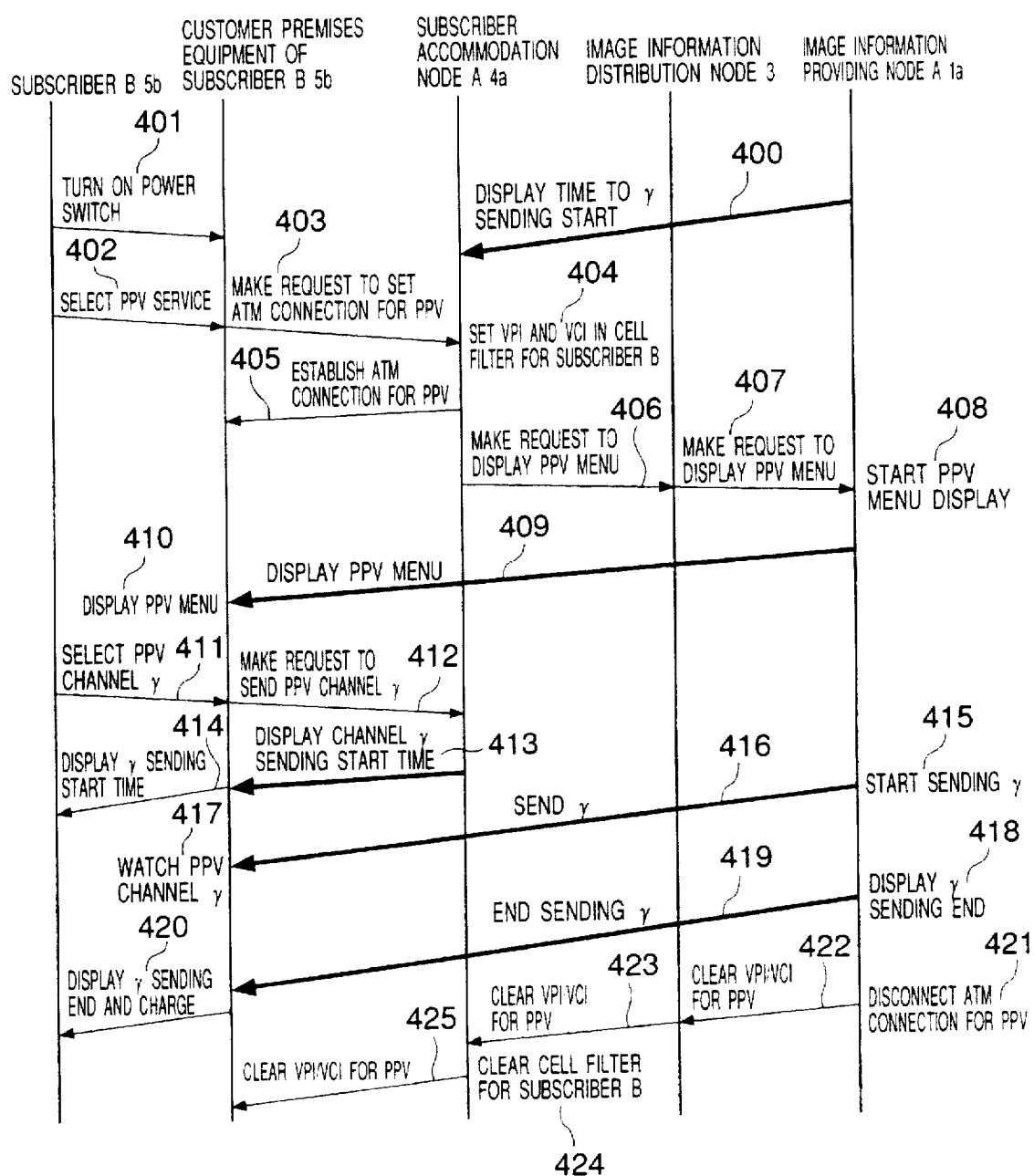
FIG. 13 is a sequence chart of another image providing service operation performed by the image information distribution system of the invention.

FIG. 13 is an operation sequence chart showing the different embodiment of the PPV service offered by the image information distribution system of the invention. It shows the operation performed when the subscriber A 5a has already requested the PPV service and the ATM cell carrying the television channel γ for the PPV service is received at the subscriber accommodation node A 4a when the subscriber B 5b requests the PPV service. The operation of the embodiment will be described with reference to FIG. 13.

In the figure, numeral 400 denotes a state in which another subscriber has already requested the television channel γ in the PPV service and the ATM cell for the PPV service is received at the subscriber accommodation node, for example, in the embodiment previously described with reference to FIG. 12, steps (a)–(c) terminate and the customer premises equipment of the subscriber A 5a waits for the requested program to start (321–324 in FIG. 12).

(a) In this state, when the subscriber B 5b turns on the power switch of the customer premises equipment at 401 and operates the control pad 58 for selecting the PPV service at 402, the customer premises equipment requests the subscriber accommodation node A 4a to set ATM connection for the PPV service at 403. Since the ATM connection for the PPV service is already established between the image information providing node A 1a and the subscriber accommodation node A 4a, the subscriber accommodation node A 4a only sets VPI and VCI for the PPV service in the VPI/VCI table in the cell filter for the subscriber B 5b at 404 and sets the ATM connection for the PPV service so that the ATM cell for the PPV service can also be sent to the customer premises equipment of the subscriber B 5b at 405.

(b) The subscriber accommodation node A 4a requests the image information distribution node 3 to display a PPV service menu at 406. The image information distribution node 3, in turn, requests the image information providing node A 1a to display a PPV service menu at 407. The image information providing node A 1a starts PPV menu display at 408 and sends the PPV service menu to the customer premises equipment of the subscriber B 5b through the already established ATM connection for the PPV service between the image information providing node A 1a and the subscriber accommodation node A 4a and the ATM connection established at 405 between the subscriber accommodation node A 4a and the customer premises equipment of the subscriber B 5b at 409. The customer premises equipment of the subscriber B 5b displays the received PPV service menu on the monitor 57 at 410. The subscriber B 5b selects the program on the PPV service television channel γ at 411. The γ selection request is sent to the subscriber accommodation node A 4a at 412.

(c) Since the subscriber accommodation node A 4a has already received the program on the television channel γ at 400, upon reception of the selection request from the subscriber B 5b, the subscriber accommodation node A 4a also sends out a screen to the program start on the television channel γ, such as the time to start sending the program, to the customer premises equipment of the subscriber B 5b like the subscriber A 5a at 413. It is displayed at the subscriber home at 414.

(d) When the start time of the television channel γ is reached, the image information providing node A 1a starts sending the program on the television channel γ at 415. The image information is also transmitted to the subscriber B 5b through the already established ATM connection for the PPV service at 416. The subscriber B 5b watches it on the monitor 57 at 417. Upon termination of the program on the television channel, the image information providing node A 1a sends a command to display γ sending end at 418. This information is transmitted through the ATM connection for the PPV service at 419 and the subscriber B 5b receives the PPV service television channel γ program end and charge display, etc., on the monitor 57 at 420. Then, as in the preceding embodiment, the image information providing node A 1a starts disconnection of the ATM connection for the PPV service at 421. It is transmitted up to the customer premises equipment and the PPV service ends at 422–425.

Next, a different embodiment of the PPV service offered by the image information distribution system of the invention will be discussed.

Figure 14:
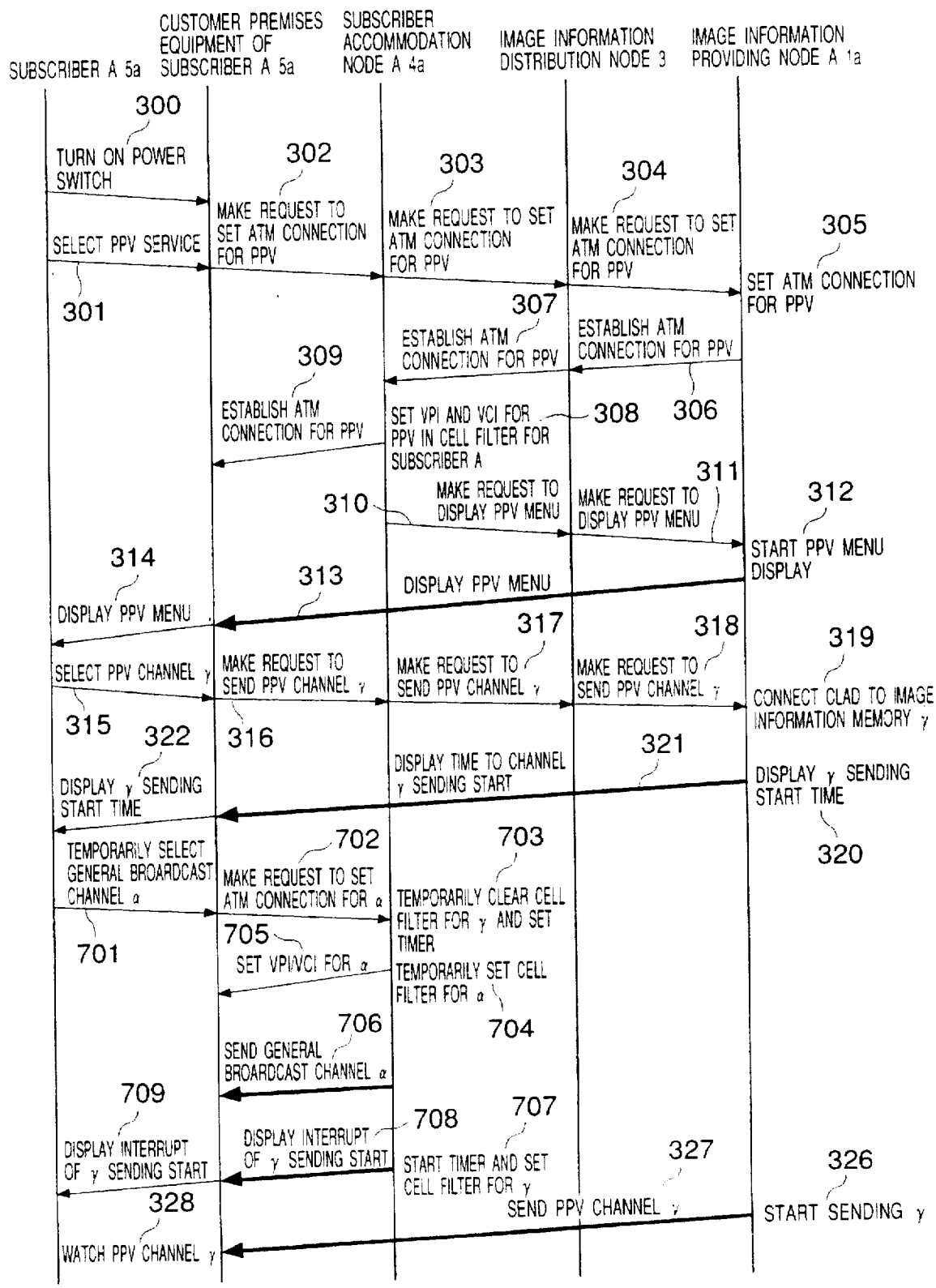
FIG. 14 is a sequence chart of another image providing service operation performed by the image information distribution system of the invention.

FIG. 14 is an operation sequence chart showing the different embodiment of the PPV service offered by the image information distribution system of the invention. It shows the operation performed when the subscriber A 5a selects PPV television channel γ and waits for the requested program to start during which they receive another image information distribution service, then watch the television channel γ until the program ends. The operation of the embodiment will be described with reference to FIG. 14.

(a) When the subscriber A 5a turns on the power switch of the customer premises equipment at 300 and operates the control pad 58 for selecting the PPV service at 301, the customer premises equipment requests the subscriber accommodation node A 4a to set ATM connection for the PPV service at 302. The subscriber accommodation node A 4a requests the image information distribution node 3 to set the ATM connection for the PPV service at 303. In the embodiment, at this point in time, no subscribers have requested the PPV service. Therefore, the image information distribution node 3 requests the image information providing node A 1a to set the ATM connection for the PPV service at 304. The image information providing node A 1a sets VPI and VCI for the ATM connection for the PPV service at 305 and establishes the ATM connection for the PPV service from the image information providing node A 1a to the image information distribution node 3 at 306. Subsequently, the image information distribution node 3 sets VPI and VCI and establishes the ATM connection for the PPV service from the image information distribution node 3 to the subscriber accommodation node A 4a at 307. The subscriber accommodation node A 4a sets the VPI and VCI in the VPI/VCI table 64 in the cell filter for the subscriber A 5a so as to allow the ATM cell for the PPV service to pass at 308. The ATM connection for the PPV service is now established between the subscriber accommodation node A 4a and the customer premises equipment of the subscriber A 5a at 309.

(b) The subscriber accommodation node A 4a requests the image information distribution node 3 to display a PPV service menu at 310. In the embodiment, the image information distribution node 3, which does not yet receive the PPV service, requests the image information providing node A 1a to display a PPV service menu at 311. The image information providing node A 1a starts PPV service menu display at 312 and sends the PPV service menu through the already established ATM connection at 313. The customer premises equipment of the subscriber A 5a displays the received PPV service menu on the monitor 57 at 314. In the embodiment, when the subscriber A 5a uses the control pad 58 to select the television channel γ from the displayed PPV service menu at 315, the customer premises equipment receives it and sends a request for sending PPV service television channel γ to the subscriber accommodation node A 4a at 316. Subsequently, the subscriber accommodation node A 4a requests the image information distribution node 3 to send the PPV service television channel γ at 317. The image information distribution node 3, in turn, requests the image information providing node A 1a to send the PPV service television channel γ at 318.

(c) The image information providing node A 1a connects the CLAD 14a or 14b for converting image information into an ATM cell to the image information memory 13a which stores image information for the television channel γ at 319. Image information can also be sent out from the image information storage 11a or 11b directly to the CLAD without using the image information memory 13a, as in the embodiment previously described with reference to FIG. 12. The controller 17 sends out information indicating the sending start time of the program on the television channel γ to the subscriber A 5a through the already established ATM connection for the PPV at 320 and 321. When receiving it, the subscriber A 5a can read the program start time of the television channel γ from the monitor at 322.

(d) In this state, when the subscriber A 5a selects general broadcast television channel α to watch a program on the television channel α until the start time of the PPV service television channel γ at 701, the subscriber accommodation node A 4a temporarily clears the VPI and VCI for the PPV service television channel γ set in the cell filter (temporarily clears the cell filter) and starts a timer (not shown) in the controller 45 at 703, then sets the VPI and VCI of the ATM cell carrying the general broadcast television channel α in the VPI/VCI table in the cell filter at 704. In the embodiment, since the subscriber accommodation node A 4a is already receiving the general broadcast television channel α, the connection for the television channel α is immediately established at 705. The television channel α is sent out through the ATM connection at 706. If the subscriber accommodation node A 4a does not receive the general broadcast television channel α, it receives the general broadcast television channel α by the procedure described in the preceding embodiment.

(e) When the start time of the PPV service television channel γ is reached, an interrupt is generated from the timer. With this interrupt utilized as a trigger, the VPI and VCI of the ATM cell carrying the PPV service television channel γ are set in the cell filter at 707. Interrupt display of the television channel sending start is sent out from the subscriber accommodation node A 4a to the customer premises equipment of the subscriber A 5a at 708 and the information is displayed on the monitor 57 of the customer premises equipment at 709. After this, sending the PPV service television channel γ is started at 326. The subsequent operation, such as the end operation, is the same as in the PPV service described above.

Thus, the image information distribution system of the invention enables the subscribers to select a program at high speed with less waiting time, like a general broadcasting service, and moreover can offer high-quality and economical PPV image providing service without image quality variations from one subscriber to another. The system also allows the subscribers to receive another image providing service during the time of waiting for the PPV service. It can offer easy-to-use image providing service to the subscribers.

An embodiment of the video on demand (VOD) service offered by the image information distribution system of the invention will be discussed. The VOD service is an image information providing service of the type wherein the subscriber can select any desired image information at any desired time, in order to watch the image information. Further, it can also provide the subscriber with a screen control function which enables the subscriber to "temporarily stop," "play," "rewind," "feed fast forward," etc., the provided image information by transferring screen control signals, etc., to and from the image information distribution system, via a network, in conversational mode.

First, an embodiment for the image information providing node B 1b to offer the VOD service to subscribers G 5g and H 5h will be discussed as an embodiment of the VOD service.

Specifically, a signal flow for when the subscribers G 5g and H 5h operate their control pads 58, shown in FIG. 7, for sending a VOD service request to the image information providing node B 1b and the image information providing node B 1b then sends the requested image information to the subscribers, will be described with reference to FIG. 1.

(a) When the controller 17 at the image information providing node B 1b recognizes that the VOD service is requested from control signals received from the subscribers, the image information providing node B 1b establishes a virtual path VP 8c for the VOD service and virtual channels VCs 7d and 7e corresponding to the subscribers G 5g and H 5h in the virtual path. That is, ATM connection is established from the image information providing node to the subscribers, as with other image information providing services described in the preceding embodiments. However, since the VOD service meets above-mentioned various screen control requests made by the subscriber for the provided image information, some virtual channels VCs are established corresponding to the subscribers. Next, the image information providing node B 1b retrieves image information requested by each subscriber, copies the image information requested by the subscribers G 5g and H 5h into the image information memories 13a and 13b corresponding to the virtual channels VCs from the image information storage units 11a and 11b at high speed via the HIPPI interface or the like, and releases the image information storage units 11a and 11b. To offer the VOD service, the image information is thus copied into the image information memories 13a and 13b corresponding to the virtual channels, whereby when one subscriber watches one image information in the VOD service, if another subscriber requests the image information, this subscriber need not wait until the current subscriber watching the image information terminates the VOD service. Of course, while image information is being copied into the image information memories 13a and 13b from the image information storage units 11a and 11b, if another subscriber requests the image information, they must wait until the copying is complete. However, the wait time can be shortened by installing a plurality of image information storage units holding the same image information.

(b) At the subscriber accommodation node B 4b, the cell filters are set corresponding to the subscribers as with the image information providing service described in the preceding embodiments. That is, the requested image information is provided only for the subscribers G 5g and H 5h and is not sent out to other subscribers accommodated in the subscriber accommodation node. The image information is also broadcast from the image information distribution node 3 via the image information distribution network 6 to the other subscriber accommodation node A 4a, but the cell filters also operate at the subscriber accommodation node A 4a, so that the VOD service image information is not sent out to the subscribers accommodated in the subscriber accommodation node A 4a.

(c) In the VOD service offered by the image information distribution system of the invention, image information in the image information storage unit 11a, 1b is temporarily copied into the image information memory 13a, 13b, then provided at the image information providing node B 1b, as shown in FIG. 2. This feature enables the subscribers G 5g and H 5h to operate the control pad 58, shown in FIG. 7, for controlling memory read, etc., to perform dialogical screen control such as "temporary stop," "restart," "rewind," "fast forward," etc., of the provided image information. It provides the screen provided by the VOD service with a function similar to that enabling the subscriber to repeat or feed fast forward a desired screen by operating an image information apparatus such as a video cassette recorder installed at their home.

To terminate the VOD service, the subscriber again operates the control pad 58 for informing the image information providing node B 1b that the VOD service should be terminated. When receiving a control signal indicating the end of the service, the image information providing node B 1b disconnects the ATM connection to the subscriber like other image information providing services, and releases the image information memory 13a, 13b. The memories are installed at the image information providing node in the embodiment. However, as described in the preceding embodiment showing the system configuration, the image information memory 48 can also be installed in the subscriber accommodation node 4b shown in FIG. 6 into which image information is copied for providing the screen control function. The repeater node 2 or the image information distribution node 3 in the network may be provided with the image information memory for storing image information corresponding to ATM connection, providing control as described above.

The image information distribution system of the invention temporarily stores image information in the memory before providing it. Thus, the subscriber can perform screen control as they desire. In addition, if two or more subscribers request the same program, the image information storage occupation time can be shortened for reducing the subscriber wait time, thus effecting a fast response system. Of course, the wait time can be further reduced by installing a number of image information storage units. If the image information storing memories, etc., are placed at a node near the subscriber as the provided program is transmitted up to the node near the subscriber in the preceding embodiment, transfer of the screen control signal can also be simplified and moreover a fast response -system with less delay can be provided.

Next, an operation of an embodiment of the VOD service offered by the image information distribution system of the invention will be discussed.

Figure 15:
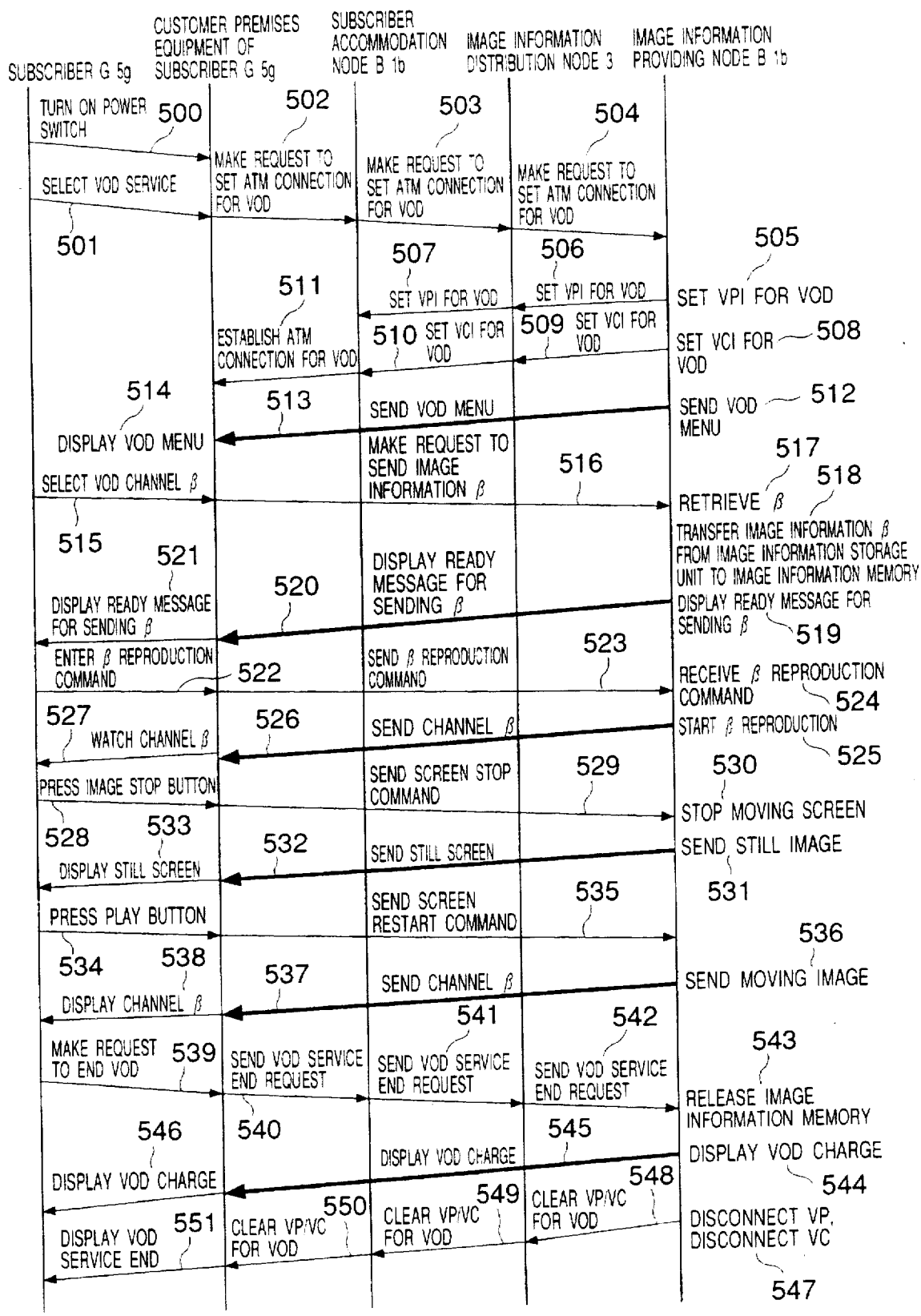
FIG. 15 is a sequence chart of another image providing service operation performed by the image information distribution system of the invention.

FIG. 15 is an operation sequence chart showing the embodiment of the VOD service offered by the image information distribution system of the invention. It shows the operation performed when the subscriber G 5g selects VOD television channel β, then watches the image information β copied into the image information memory in the image information providing node B 1b, during which he or she "stops" sending the image information β, then "restarts" it, and finally terminates the service. The embodiment assumes that only the subscriber G 5g selects the VOD service.

(a) When the subscriber G 5g turns on the power switch of the customer premises equipment at 500 and operates the control pad 58 shown in FIG. 7 for selecting the VOD service at 501, the customer premises equipment requests the subscriber accommodation node B 4b to set ATM connection for the VOD service at 502. The subscriber accommodation node B 4b requests the image information distribution node 3 to set the ATM connection for the VOD service at 503. When receiving the request, the image information distribution node 3 requests the image information providing node B 1b to set the ATM connection for the VOD service at 504. In response to the request, the image information providing node B 1b starts setting a virtual path VP for the VOD service at 505 and establishes the VP for the VOD service between the image information providing node B 1b and the image information distribution node 3 at 506. After this, the image information distribution node 3 establishes the VP for the VOD service between the image information distribution node 3 and the subscriber accommodation node B 4b at 507. Next, a virtual channel VC for the VOD service for providing VOD service image information is established in the VP. To do this, first the image information providing node B 1b starts setting the VC for the VOD service at 508 and establishes the VC for the VOD service between the image information providing node B 1b and the image information distribution node 3 at 509, then the image information distribution node 3 establishes the VC for the VOD service between the image information distribution node 3 and the subscriber accommodation node B 4b at 510. The controller 45 at the subscriber accommodation node B 4b sets the VPI and VCI of the ATM cell carrying the image information for the VOD service in the VPI/VCI table 64 in the cell filter 43a, 43b for the subscriber G 5g at 511. The ATM connection for the VOD service is now established.

(b) The image information providing node B 1b starts sending a VOD service menu at 512 and sends the VOD service menu to the subscriber G 5g through the established ATM connection at 513, the menu is displayed on the monitor 57 at the subscriber home at 514. The subscriber G 5g uses the control pad 58 shown in FIG. 7 to select the VOD service television channel β out of the displayed menu at 515. The customer premises equipment converts the request into a control signal and sends the signal to the image information providing node B 1b at 516.

(c) The image information providing node B 1b retrieves the image information β of the program selected by the subscriber from the image information storage units 11a, 11b at 517 and sends it to the image information memory 13a at 518. Upon completion of transferring the image information β from the image information storage units 11a, 11b to the image information memory 13a, the image information providing node B 1b starts display of a ready message for sending the VOD service image information β at 519 and sends the ready display for sending the VOD service image information β to the customer premises equipment of the subscriber G 5g through the VOD service ATM connection at 520, whereby the ready message for sending the VOD service image information β is displayed on the monitor 57 at the subscriber home at 521. At this point in time, when the subscriber G 5g enters a reproduction command of the image information through the control pad 58 at 522, the customer premises equipment of the subscriber G 5g converts the command into a control signal and sends the signal to the controller 17 at the image information providing node B 1b at 523 and 524. With the control signal as a trigger, reproduction of the image information is started at 525 and the image information is sent from the image information providing node B 1b to the subscriber G 5g at 526. That is, the subscriber G 5g can watch the VOD service image information β on the monitor 57 at 527.

(d) While watching the image information β, the subscriber G 5g can enter an image stop command through the control pad 58 to make a request for stopping the current image information β being provided at 528. The request signal, which contains the frame number of the image information being received at the subscriber G 5g, is sent to the image information providing node B 1b at 529. The image information providing node B 1b analyzes the frame number of the image information contained in the image stop request signal at 530 and sends the image information assigned the frame number consecutively to the subscriber G 5g at 531 and 532, thereby displaying the image having the frame number requested by the subscriber G 5g as a still screen on the monitor 57 of the subscriber at 533 for stopping the current image information β being provided. Next, when the subscriber G 5g enters an image reproduction command through the control pad 58 at 534, the command is sent to the image information providing node B 1b as a control signal at 535. The control signal also contains the frame number of the current image information being received like the image stop control signal. When receiving the control signal, the controller 17 at the image information providing node B 1b again starts reproduction of the image information β at 536. This image information β is sent to the customer premises equipment of the subscriber G 5g through the ATM connection at 537 and is reproduced on the monitor 57 of the subscriber G 5g at 538. That is, the program selected by the subscriber is again provided as a moving image.

(e) When the subscriber G 5g makes a request for terminating the VOD service at 539, the customer premises equipment of the subscriber G 5g sends the VOD service end request to the subscriber accommodation node B 4b at 540 from which the request is sent to the image information distribution node 3 at 541 from which the request is sent to the image information providing node B 1b at 542. When receiving the request, the controller 17 at the image information providing node B 1b releases the image information memory 13a at 543, then starts VOD service charge display at 544 and sends it to the subscriber G 5g through the ATM connection at 545. The VOD service charge is displayed on the monitor 57 of the subscriber G 5g at 546. After this, the VOD service ATM connection (VP/VC) is disconnected from the image information providing node B 1b in order at 547–550. When the ATM connection is disconnected, a VOD service end message is displayed on the monitor 57 of the subscriber G 5g at 551. The VOD service is now terminated.

Although the frame number is used as an image information control parameter in the embodiment, image information memory addresses or time stamp information in the ATM cell containing the image information can also be used for providing similar control in place of the frame number for specifying an image information frame. If an image control signal from the subscriber arrives at the controller with a delay in the network, the parameter can be used to retrieve the screen desired by the subscriber and provide it. (For example, since the image transmitted from the memory advances when the control signal arrives, the controller performs control such as return to the requested screen.) Therefore, an easy-to-use VOD service can be offered which enables the subscriber to watch any desired screen at any desired time by simple operation. Although we have discussed the embodiment of the VOD service which enables the subscriber to perform screen control by taking stop and reproduction (play) as an example, control such as "fast forward," "rewind," etc., mentioned above can also be provided in a similar sequence by controlling the image memory with image information control parameters in response to command requests entered by the subscriber. Even the system via the network can offer the easy-to-use VOD service having an excellent user interface capable of performing screen control meeting subscriber's requests, namely, an image providing service providing a function as if the subscriber obtained image information by operating a dedicated apparatus, such as a video cassette recorder, at home. As in the preceding embodiments, control information can be transferred between the subscriber and the system over a discrete line, a common line, or ATM connection for carrying image information to accomplish the function of the invention.

The image information distribution system of the invention can offer various image providing services with additional functions in addition to the image providing services described in the embodiments. For example, a programming function can also be provided for the subscriber by controlling the cell filter in the subscriber accommodation node together with the time. The operation will be discussed below.

The subscriber uses the control pad 58 to send a request for watching any desired program, preselected in the general broadcasting service, PPV service, VOD service, etc., described above, from the customer premises equipment to the subscriber accommodation node A 4a or B 4b before the program starts. The controller 45 at the subscriber accommodation node. A 4a or B 4b stores the program preselected by the subscriber, and the program start time, and starts a timer to the program start time. When the controller 45 recognizes the program start time as a result of an interrupt from the timer, it sets ATM connection by setting the VPI and VCI of the ATM cell carrying the television channel of the program in the VPI/VCI table 64 in the cell filter. At that time, the controller 45 at the subscriber accommodation node also sends a control signal for powering on the apparatus at the subscriber home, thereby powering on the customer premises equipment and the monitor of the subscriber. Thus, the apparatus at the subscriber home is automatically powered on at the time programmed by the subscriber for sending the program preselected by the subscriber. At the program end time, the controller 45 sends a control signal for powering off the customer premises equipment and the monitor of the subscriber, then clears setting of the cell filter. The television channel setting sequence is the same as in the embodiment described above. The power on/off procedure enables the system to forcibly power on the apparatus at the subscriber home, for example, for emergency broadcasting in the event of a disaster, although the subscriber does not preselect any program.

As described above, the image information distribution system of the invention can provide an easy-to-use, fast response system of simple configuration. More specifically, (1) if the subscriber changes the current channel being received to an adjacent channel, the channel change can be made by simply negotiating with the node accommodating the customer premises equipment, and thus a very rapid channel change is enabled compared with negotiation between the customer premises equipment and the image information providing node. (2) When one subscriber requests image information, if the image information distribution node accommodating the subscriber has already received the image information, the subscriber can exchange a necessary control signal with the subscriber accommodation node for obtaining or changing the image information at higher speed than the subscriber exchanges the control signal with the image information providing node. (3) If image information requested by one subscriber is requested by another subscriber accommodated in the same image information providing node, only one already setup VC is required between the image information providing node and the image information distribution node; network resources can thus be saved. (4) When the subscriber is receiving general image information or a program such as a PPV service program, and changes the channel to its preceding or following channel, faster response performance can be provided by exchanging a control signal with the node already receiving the image information. (5) The customer premises equipment can be controlled from the subscriber accommodation node to enable the subscriber to watch his or her preselected program. (6) When a disaster or the like occurs, the network manager can forcibly turn on the customer premises equipment for emergency broadcasting. (7) Since a VP distributed to a plurality of subscriber accommodation nodes is set as one VP between the image information providing node and the image information distribution node, the network resources can be saved. (8) Since a VP is assigned for each image providing service type, the VP and VC setting sequence for each image providing service can be simplified. (9) Although the image control signal from the subscriber arrives at the controller with a delay in the network, subscriber control can be performed for the time position nearer to the time position of the moving image desired by the subscriber. (10) In the video on demand service whereby the subscriber can receive desired image information at a desired time, the subscriber can perform control of image information sending start, image information stop, image information sending at any desired time position in any desired image information, etc.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An image information distribution system, comprising:
   an image information providing node for storing image information; and
   a subscriber accommodation node for connecting said image information providing node to customer premise's equipment of a subscriber which receives image information through a transmission line in an asynchronous transfer mode, wherein said image information providing node transmits first image information requested by the subscriber and second image information selected by said image information providing node according to a predetermined rule to said subscriber accommodation node; and said subscriber accommodation node comprises:

a memory for storing the first image information and the second image information, a filter for extracting the first image information from the memory, and a terminator for providing image information extracted by the filter for the customer premise's equipment of the subscriber.

2. The image information distribution system as defined in claim 1, wherein when the second image information is requested by the subscriber who previously requested the first image information, said filter extracts the second image information from the memory, and said terminator provides the second image information extracted by said filter for the customer premise's equipment of the subscriber.

3. The image information distribution system as defined in claim 2, wherein said transmission line has virtual paths, each of which has an identifier corresponding to a type of image information providing service;

each of said virtual paths has virtual channels, each of which has an identifier corresponding to image information, which transmit the first image information and the second image information to said subscriber accommodation node through different virtual channels on the same virtual path; and said filter extracts the image information according to the identifier of the virtual path and the identifier of the virtual channel.

4. The image information distribution system as defined in claim 3, wherein when said subscriber accommodation node requests said image information providing node to transfer new image information in response to an image information change request from the subscriber, the new image information is transferred to said subscriber accommodation node on a virtual channel different from the virtual channels which transfer the first image information and the second image information in the same virtual path.

5. An image information distribution system comprising:

an image information providing node for storing image information; and a subscriber accommodation node for connecting said image information providing node to customer premise's equipment of a subscriber which receives image information through a transmission line in an asynchronous transfer mode, wherein said customer premise's equipment comprises:

informing means for providing request image information and time information requested by the subscriber to said subscriber accommodation node, and a monitor for displaying the image information, which can be turned on and off by a control signal from said subscriber accommodation node; and said subscriber accommodation node comprises:

storing means for storing the request information and the time information provided by said informing means, a timer which is actuated when the request information and the time information are provided from said informing means, control signal transmitting means for transmitting the control signal to the monitor when said timer indicates a time indicated by the time information, setting means for setting an asynchronous transfer mode path between said image information providing node and the customer premise's equipment of the subscriber who requests the image information, when the timer indicates the time indicated by the time information, and image information transferring means for transferring the image information corresponding to the request information from said image information providing node to the customer premise's equipment of the subscriber who requests the image information through the asynchronous transfer mode path.

6. An image information distribution system, comprising:

an image information providing node for storing image information; and a subscriber accommodation node for connecting said image information providing node to customer premise's equipment which receives image information through a transmission line in an asynchronous transfer mode; wherein said customer premise's equipment comprises a monitor for displaying the image information, which can be turned on and off by a control signal from one of said subscriber accommodation node and said image information providing node; and one of said subscriber accommodation node and said image information providing node comprises:

a control signal transmitting means for transmitting the control signal to the monitor, setting means for setting an asynchronous transfer mode path between said image information providing node and the customer premise's equipment, and image information transferring means for transferring the image information from said image information providing node to the customer premise's equipment through the asynchronous transfer mode path after said control signal transmitting means transmits the control signal to the monitor.

7. An image information distribution system, using a communication network, comprising:

a transmission line for transferring information in an asynchronous transfer mode; and a node for processing information, for transferring image information from an image information source installed in said node to a subscriber of the communication network, wherein said node comprises:

a memory for storing information corresponding to the subscriber, transferring means for transferring the image information requested by the subscriber from the image information source to said memory in response to a request by the subscriber, and a controller for controlling reading-out of the image information from the memory, which has been transferred to the memory in response to an image information control signal transmitted from the subscriber who has requested the image information, so as to provide the image information for the subscriber who has requested the image information in a playing mode as described by the subscriber.

8. The image information distribution system as defined in claim 7, wherein the image information control signal from the subscriber is a signal for selecting reproduction, stop or pause, fast reproduction or skip, or retrieval of image information, and controls reading of the information stored in said memory.

9. The image information distribution system as defined in claim 7, wherein said node provides information corresponding to control signal delay time for the subscriber to said controller; and when said controller receives the control signal, said controller corrects the memory control operation according to the information before providing an image signal for the subscriber.

10. An image information distribution system, using a communication network, comprising:

a transmission line for transferring information in an asynchronous transfer mode; and a node for processing information, for transferring image information from an image information source installed in said node to a subscriber of the communication network, wherein said node comprises:

a memory for storing information corresponding to the subscriber, transferring means for transferring the image information requested by the subscriber from the image information source to said memory, and a controller for extracting the image information from the memory in response to an image information control signal transmitted from the subscriber who requests the image information and for providing the image information for the subscriber who requests the image information, wherein the image information transferred from said memory to the subscriber is image information provided by adding, to each of image frames making up the image information, one of information corresponding to a storage location of the image frame in said memory and information corresponding to a time of transmission from a top image frame of the image information to an end image frame of the image information;

when the subscriber controls the image information, the image information control signal is transmitted to the controller with information corresponding to the storage location or the time; and said controller controls said memory for providing the image information in response to the information corresponding to the storage location or the time.

* * * * *